US010733038B2

(12) United States Patent
Hotta

(10) Patent No.: US 10,733,038 B2
(45) Date of Patent: Aug. 4, 2020

(54) ABNORMAL MODULE DETECTION USING AGGREGATED TIME INTERVAL ANALYSIS

(71) Applicant: FUJITSU LIMITED, Kawasaki-shi, Kanagawa (JP)

(72) Inventor: Yuuji Hotta, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 77 days.

(21) Appl. No.: 15/804,034

(22) Filed: Nov. 6, 2017

(65) Prior Publication Data

US 2018/0060156 A1 Mar. 1, 2018

Related U.S. Application Data

(63) Continuation of application No. 14/069,442, filed on Nov. 1, 2013, now abandoned.

(30) Foreign Application Priority Data

Jan. 7, 2013 (JP) .................................. 2013-000705

(51) Int. Cl.
*G06F 11/07* (2006.01)

(52) U.S. Cl.
CPC ...... *G06F 11/0754* (2013.01); *G06F 11/0715* (2013.01)

(58) Field of Classification Search
CPC ... H04L 41/0659–0677; G06F 11/0715; G06F 11/0754; G06F 11/079; G06F 11/3612; G06F 11/3616
See application file for complete search history.

(56) References Cited

U.S. PATENT DOCUMENTS

| 7,412,448 B2* | 8/2008 | Agarwal ............... G06F 11/008 |
| 7,606,896 B2 | 10/2009 | Kobayashi |
| 7,697,452 B2 | 4/2010 | Tachibana et al. |
| 8,270,306 B2 | 9/2012 | Oguro et al. |

(Continued)

FOREIGN PATENT DOCUMENTS

| JP | 2006-222808 | 8/2006 |
| JP | 2011-211295 | 10/2011 |

OTHER PUBLICATIONS

Great Britain Search Report dated Apr. 30, 2014 for corresponding United Kingdom Patent Application No. 1320832.7, 4 pages.

(Continued)

*Primary Examiner* — Joseph R Kudirka
(74) *Attorney, Agent, or Firm* — Fujitsu Patent Center

(57) ABSTRACT

An apparatus collects log data for each function; analyzes the log data to determine, for each function, whether a delay is present in a path of the function; classifies, for each function, one or more of a normal interval and an abnormal interval of the function based on the analyzed log data; defines, as an aggregation interval, a time interval at which two or more functions have an abnormal interval and one or more functions have a normal interval; identifies the one or more modules of paths of each function during the aggregation interval; and detects, as an abnormal module, a module that is present in two or more paths of functions with abnormal intervals during the aggregation interval and is not present in any path of the functions with normal intervals during the aggregation interval.

3 Claims, 42 Drawing Sheets

(56) References Cited

U.S. PATENT DOCUMENTS

| | | |
|---|---|---|
| 8,483,054 B2 | 7/2013 | Nishi |
| 2006/0190620 A1 | 8/2006 | Kobayashi |
| 2007/0014233 A1 | 1/2007 | Oguro et al. |
| 2007/0211645 A1 | 9/2007 | Tachibana et al. |
| 2011/0235521 A1 | 9/2011 | Nishi |

OTHER PUBLICATIONS

USPTO, (Bryan) Examiner's Answer to Appeal Brief, dated Sep. 6, 2017, in parent U.S. Appl. No. 14/069,442 [pending].
USPTO, (Bryan) Final Rejection, dated Dec. 7, 2016, in parent U.S. Appl. No. 14/069,442 [pending].
USPTO, (Bryan) Non-Final Rejection, dated Jun. 3, 2016, in parent U.S. Appl. No. 14/069,442 [pending].
USPTO, (Bryan) Final Rejection, dated Jan. 6, 2016, in parent U.S. Appl. No. 14/069,442 [pending].
USPTO, (Bryan) Non-Final Rejection, dated Jun. 22, 2015, in parent U.S. Appl. No. 14/069,442 [pending].
Great Britain Examination Report dated Oct. 23, 2018 for corresponding Great Britain Patent Application No. GB1320832.7, 5 pages.
Great Britain Examination Report dated Aug. 23, 2019 for corresponding Great Britain Application No. GB1320832.7, 3 pages.

\* cited by examiner

FIG. 3A

|    | F1 | F2 | F3 | F4 |
|----|----|----|----|----|
| p1 | 1  | 1  | 1  |    |
| p2 | 1  |    | 1  |    |
| p3 |    | 1  |    | 1  |
| p4 | 1  |    |    | 1  |
| p5 | 1  | 1  |    |    |

FIG. 3B

|    | F1 | F2 | F3 | F4 | OR (B) |
|----|----|----|----|----|--------|
| p1 | 1  | 1  | 1  |    | 1      |
| p2 | 1  |    | 1  |    | 1      |
| p3 |    | 1  |    | 1  | 1      |
| p4 | 1  |    |    | 1  | 1      |
| p5 | 1  | 1  |    |    | 1      |

FIG. 3C

|    | F1 | F2 | F3 | F4 | OR (B) | OR (C) |
|----|----|----|----|----|--------|--------|
| p1 | 1  | 1  | 1  |    | 1      | 1      |
| p2 | 1  |    | 1  |    | 1      | 1      |
| p3 |    | 1  |    | 1  | 1      | 1      |
| p4 | 1  |    |    | 1  | 1      | 1      |
| p5 | 1  | 1  |    |    | 1      | 0      |

FIG. 3D

|    | F1 | F2 | F3 | F4 | OR (B) | OR (C) | XOR (D) |
|----|----|----|----|----|--------|--------|---------|
| p1 | 1  | 1  | 1  |    | 1      | 1      | 0       |
| p2 | 1  |    | 1  |    | 1      | 1      | 0       |
| p3 |    | 1  |    | 1  | 1      | 1      | 0       |
| p4 | 1  |    |    | 1  | 1      | 1      | 0       |
| p5 | 1  | 1  |    |    | 1      | 0      | 1       |

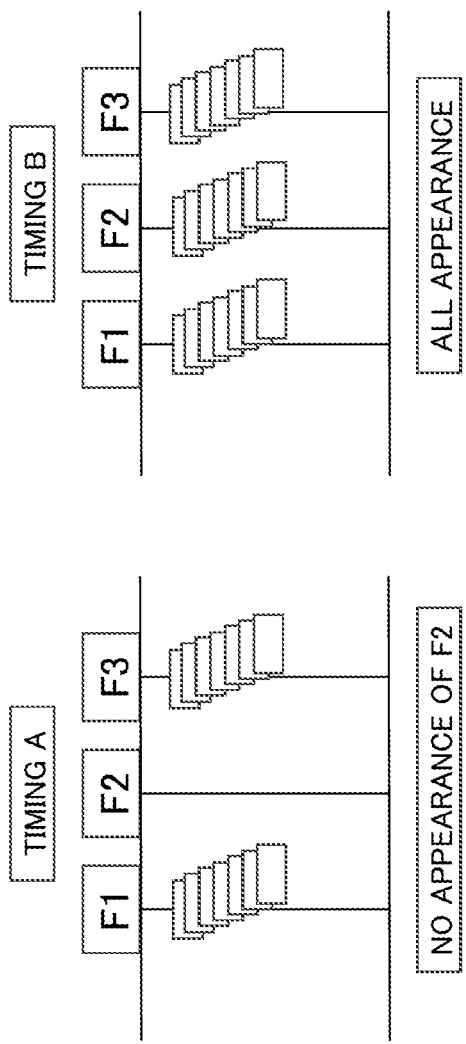

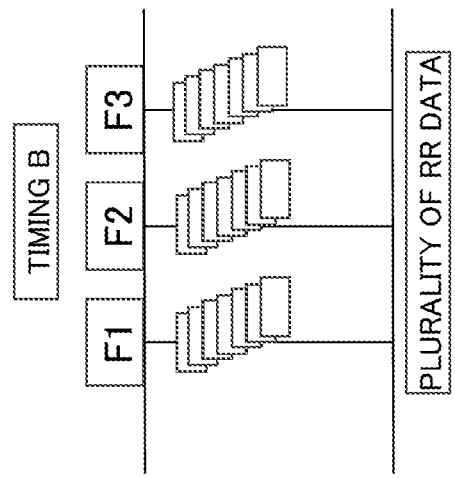
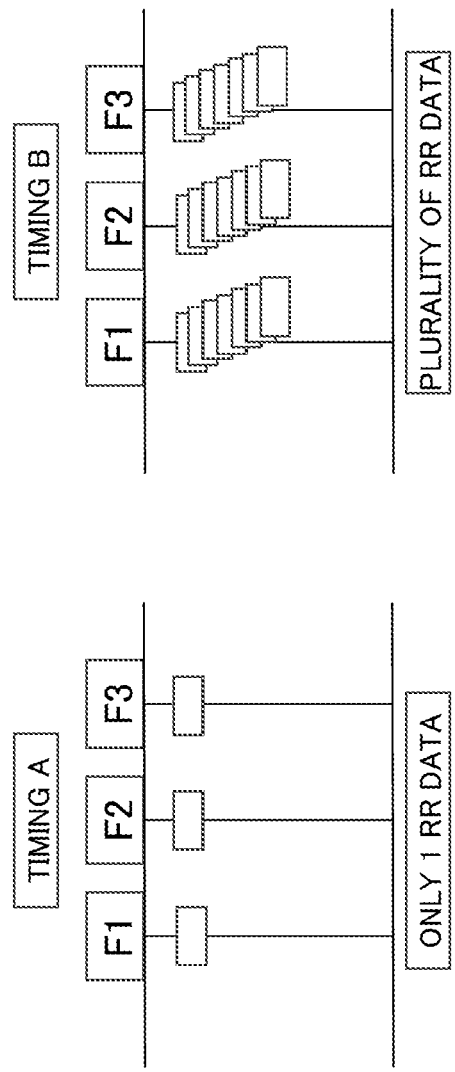

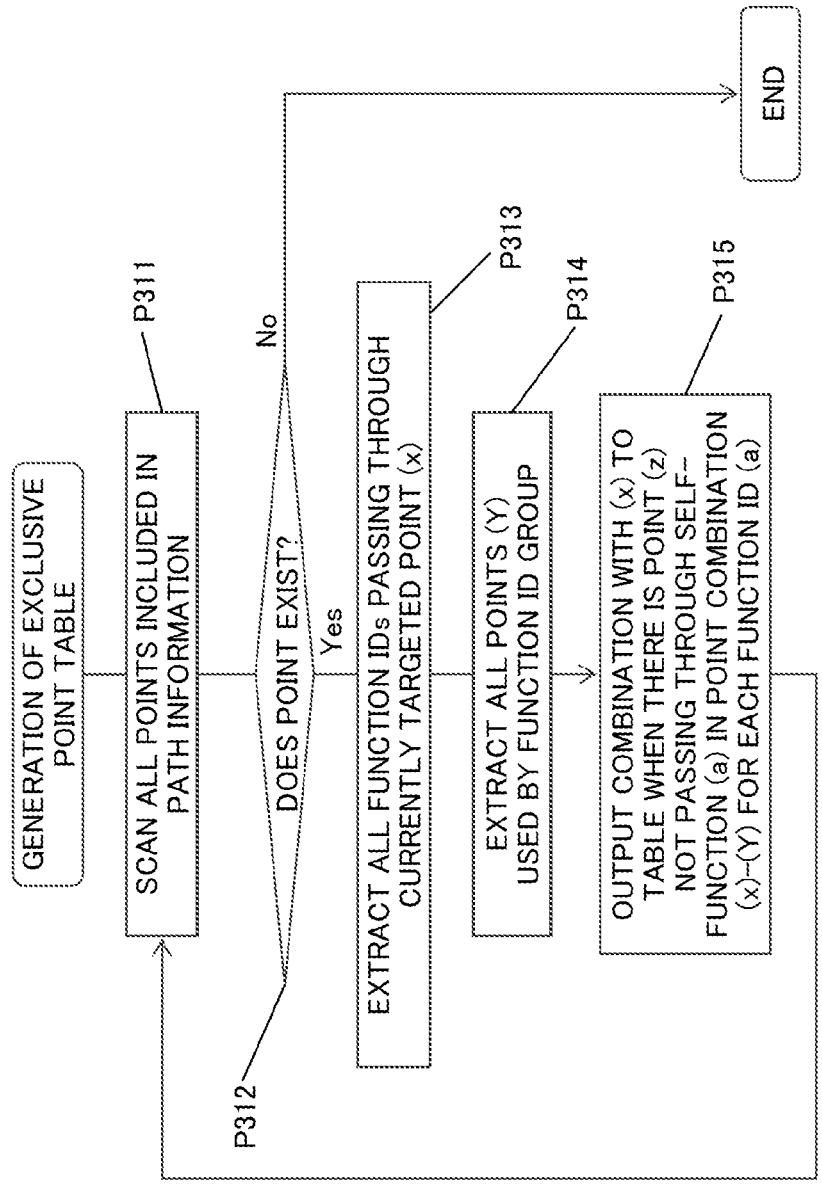

FIG. 35A

PATH INFORMATION

| FUNCTION ID | PATH INFORMATION |
|---|---|
| F1 | p1-p2-p4-p5 |
| F2 | p1-p2 |
| F3 | p1-p2-p4 |
| F4 | p1-p2-p5 |

FIG. 35B

EXCLUSIVE POINT TABLE

| KEY POINT | EXCLUSIVE POINT | FUNCTION ID | (MEANING OF RECORD) |
|---|---|---|---|
| p1 | p4 | F2,F4 | F2 AND F4 PASS THROUGH p1 BUT DO NOT PASS THROUGH p4 |
| p1 | p5 | F2,F3 | F2 AND F3 PASS THROUGH p1 BUT DO NOT PASS THROUGH p5 |
| p2 | p4 | F2,F4 | F2 AND F4 PASS THROUGH p2 BUT DO NOT PASS THROUGH p4 |
| p2 | p5 | F2,F3 | F2 AND F3 PASS THROUGH p2 BUT DO NOT PASS THROUGH p5 |
| p4 | p5 | F3 | F3 PASSES THROUGH p4 BUT DOES NOT PASS THROUGH p5 |
| p5 | p4 | F4 | F4 PASSES THROUGH p5 BUT DOES NOT PASS THROUGH p4 |

FIG. 38

| FUNCTION ID | INTRA-FUNCTION IDENTIFICATION ID | PATH INFORMATION | FREQUENCY |
|---|---|---|---|
| F1 | 1 | p1-p2-p3 | 20 |
| F1 | 2 | p1-p2-p3-p4 | 10 |

FIG. 41

| | F1 | F2 | F3 | TOTAL |
|---|---|---|---|---|
| Fi | 25 | 12 | 8 | 45 |
| p1 | 25 | 12 | 8 | 45 |
| p2 | 18 | | 8 | 26 |
| p3 | 7 | 12 | 8 | 27 |
| p4 | 18 | | | 18 |
| p5 | 25 | 12 | | 37 |

FIG. 42

| Fi | F1 | F2 | F3 | TOTAL |
|---|---|---|---|---|
| p1 | 50 | 24 | 16 | 90 |
| p2 |  |  |  | 52 |
| p3 | BLACK BOX (NO OBSERVATION) | | | 54 |
| p4 |  |  |  | 36 |
| p5 |  |  |  | 74 |

ABNORMAL MODULE DETECTION USING AGGREGATED TIME INTERVAL ANALYSIS

CROSS-REFERENCE TO RELATED APPLICATIONS

This application is a continuation of application Ser. No. 14/069,442, now abandoned, filed Nov. 1, 2013, which is based upon and claims the benefit of priority of the prior Japanese Patent Application No. 2013-000705, filed on Jan. 7, 2013, the entire contents of which are incorporated herein by reference.

FIELD

The embodiments discussed herein are related to an analysis method, an analysis apparatus, and a computer-readable recording medium storing an analysis program.

BACKGROUND

In an application program, a network service, or the like, attempts have been made to find a delay point or an abnormal point (see, for example, the following Patent Documents 1 and 2).

Generally, in order to find the delay point or the abnormal point, it is necessary to collect a log before and after the point and continue to monitor a state of the point. For example, in the case of a processing sequence of start-A-B-C-D-end, a delay of each processing of A to D can be found by collecting time-stamped logs immediately before A, in the middle of A-B, in the middle of B-C, in the middle of C-D, and immediately after D. For example, in a case where B is delayed, the delay can be found using a log between A and B (immediately before B) and a log between B and C (immediately after B)=a log before and after B.

On the other hand, in order to find an abnormal point in an application program or a network component, it is necessary to collect a large number of logs at a plurality of monitoring points.

For this reason, narrowing and identifying an abnormal point would cause a considerable execution overhead and network load.

[Patent Document 1] Japanese Patent Publication No. 2011-211295
[Patent Document 2] Japanese Patent Publication No. 2006-222808

In such an application program or network component, processing using a common module is performed in a plurality of processings.

A delay of a particular module causes a delay in a plurality of relevant processings. An identification of a module being delayed may be performed by, for example, taking an average of a response time at regular time intervals, comparing the average time with a normal or abnormal threshold value, and classifying normally operating processing and delayed processing based on the comparison result.

However, depending on a method of taking a length, a timing, or the like of an interval during which processing time is averaged, appropriate data may not be obtained, for example, processing to be originally diagnosed as abnormal may be classified as normal processing, or information necessary for identifying a problem may not be obtained.

SUMMARY

An aspect of a non-transitory computer-readable recording medium storing therein an analysis program that causes a computer to execute a process, the computer being provided as part of a system including the computer and a plurality of modules connected via a network, the system executing a plurality of functions of an analysis target by the plurality of modules, each of the plurality of functions utilizing a path of one or more of the plurality of modules and at least two of the plurality of functions utilizing a common module of the plurality of modules, the process including: collecting log data for each of the plurality of functions; analyzing the log data to determine, for each function of the plurality of functions, whether a delay is present in the path of the function, based on a response time derived from the log data; classifying, for each function of the plurality of functions, one or more of a normal interval and an abnormal interval of the function based on the analyzed log data, the normal interval being a time interval for data in which no delay is determined and the abnormal interval being a time interval for data in which a delay is determined; defining, as an aggregation interval, a time interval at which two or more functions have an abnormal interval and one or more functions have a normal interval; identifying the one or more modules of paths of each function during the aggregation interval; and detecting, as an abnormal module, a module of the plurality of modules that is present in two or more paths of functions with abnormal intervals during the aggregation interval and is not present in any path of the functions with normal intervals during the aggregation interval, the abnormal module causing abnormalities of the one or more functions of the analysis target.

The object and advantages of the invention will be realized and attained by means of the elements and combinations particularly pointed out in the claims.

It is to be understood that both the foregoing general description and the following detailed description are exemplary and explanatory and are not restrictive of the invention

BRIEF DESCRIPTION OF DRAWINGS

FIGS. 3A to 3D are diagrams illustrating an example of matrix expressions of the relationship between the functions and the components according to the embodiment;

FIGS. 30A and 30B are comparative diagrams illustrating a state in which RR data of a part of a function does not appear in different timings in an embodiment;

FIGS. 31A and 31B are diagrams illustrating a comparison between a case where only one RR data appears and a case where a plurality of RR data appears, in different timings in an embodiment;

FIG. 34 is a flowchart describing a generation of a supplementary table (exclusive point table) in an embodiment;

FIGS. 35A and 35B are diagrams illustrating an example of a path information table and an exclusive point table according to an embodiment;

FIG. 38 is a diagram illustrating an example of frequency information (table) according to an embodiment;

FIG. 41 is a diagram illustrating an example of frequency information (table) according to an embodiment; and FIG. 42 is a diagram illustrating an example of frequency information (table) according to an embodiment.

DESCRIPTION OF EMBODIMENT(S)

Figure 1:
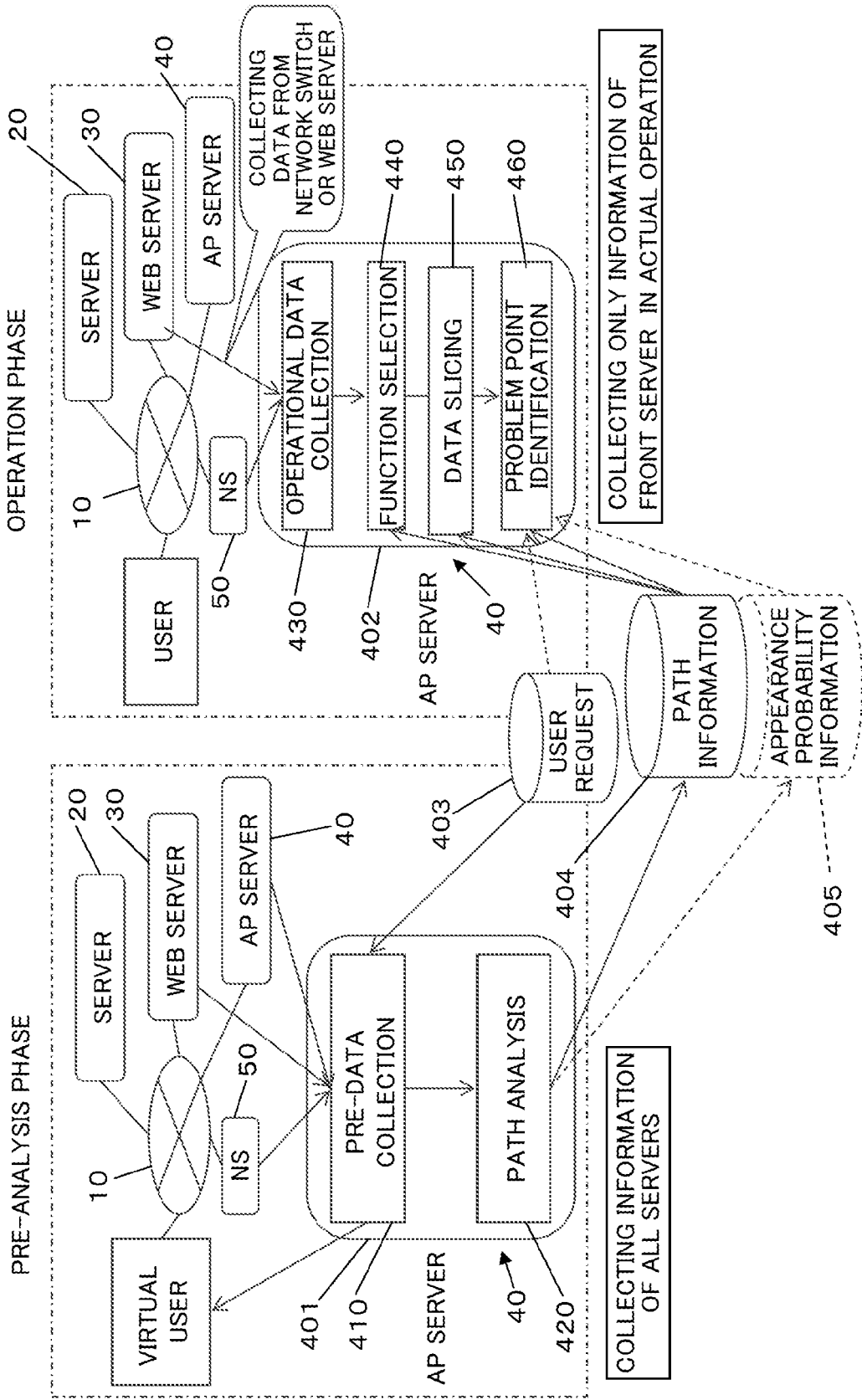
FIG. 1 is a block diagram illustrating an example of a network system according to an embodiment.

Hereinafter, embodiments will be described with reference to the drawings. However, the embodiments to be described below are merely exemplary and are not intended to exclude a variety of unspecified modifications or technical applications. Note that, in the drawings referred to in the following embodiments, parts assigned with the same reference numerals indicate the same or similar parts unless otherwise particularly mentioned.

FIG. 1 is a block diagram illustrating an example of a network system according to an embodiment. The network system illustrated in FIG. 1, for example, includes a network 10 such as Internet or the like, server groups 20, 30 and 40 connected to the network 10, and a network switch 50. The server groups 20, 30 and 40, for example, include a web server 30 or, an application (AP) server 40, other server 20, and the like.

The AP server 40, for example, includes a pre-analysis block 401, an operation block 402, a user request database 403, and a path information database 404. Optionally, the AP server 40 may include an appearance probability database 405.

The AP server 40 includes a CPU, a memory, a storage device such as a hard disk device or the like, a display device, and a printer, which are not illustrated in the drawings. The CPU implements a necessary function unit by reading and operating a predetermined program from the memory or the storage device. For example, the program includes an analysis program as an example of the program that implements the function of the pre-analysis block 401 or the operation block 402. The display device or the printer, for example, may output the results of operations by the CPU. Note that, other server 20 or the web server 30 may include a CPU, a memory, a storage device such as a hard disk device or the like, a display device, and a printer as hardware devices.

The function of the analysis program (all or partial function of each unit) is implemented in such a manner that the CPU or the like executes the predetermined program.

The program, for example, is provided in a form of being stored in a computer-readable recording medium such as a floppy disk, a CD-ROM, a CD-R, a CD-RW, an MO, a DVD, a blue-ray disk, a portable hard disk, a USB memory, or the like. In this case, the computer uses the program that is read from the recording medium, transmitted to an internal storage device or an external storage device, and stored in the storage device. Also, the program, for example, may be stored in a storage device (recording medium) such as a magnetic disk, an optical disk, an optical magnetic disk, or the like, and provided to the computer from the storage device via a communication line.

The computer as used herein is a concept encompassing hardware and an operating system (OS), and refers to hardware that operates under the control of the OS. Also, in a case where the OS is not required and an application program alone is designed to operate the hardware, the hardware itself corresponds to the computer. The hardware includes at least a microprocessor such as the CPU or the like, and a unit configured to read the program stored in the recording medium.

The application program includes a program code executing the functions of the analysis program in the computer as described above. Also, a part of the function may be implemented by not the application program but the OS.

Also, the recording medium may use a variety of computer-readable media such as an IC card, a ROM cartridge, a magnetic tape, a punch card, an internal storage device (memory such as a RAM or a ROM) of the computer, an external storage device of the computer, or a printed matter with a printed code such as a bar code, in addition to the floppy disk, the CD-ROM, the CD-R, the CD-RW, the DVD, the magnetic disk, and the optical magnetic disk as described above.

The user request database 403, the path information database 404, and the appearance probability database 405, for example, are implemented in the memory or the storage device of the AP server 40.

The pre-analysis block 401, for example, includes a pre-data collection unit 410 and a path analysis unit 420.

The pre-data collection unit 410 inputs (transmits) data (request or the like) of the user request database 403 to the network 10 as virtual user data. Note that, the pre-data collection unit 410 may store an actual request, state, and the like of an actual operation and reproduce an operational state of an actual operation.

The path analysis unit 420, for example, collects message data flowing through the respective servers 20, 30 and 40 as the result by the input of the virtual user data, performs the path analysis, and stores the analysis result in the path information database 404 as the path information.

The operation block 402, for example, includes an operational data collection unit 430, a function selection unit 440, a data slicing unit 450, and a problem point identifying unit 460.

The operational data collection unit 430 collects, for example, uniform resource locator (URL)+common gateway interface (CGI) parameter or the like from data flowing through the servers 20, 30 and 40 during the actual operation in the operation phase as, for example, log data. Note that, in the actual operation, only information of a "front server" may be collected. The "front server" refers to a server closest to the user side, which receives the request from the user, as compared with "all servers" in the pre-analysis phase. In the configuration illustrated in FIG. 1, the web server 30 may correspond to the "front server". However, depending on the configuration, a load distribution server (load balancer; not illustrated) may correspond to the "front server", and the AP server 40 may correspond to the "front server".

The function selection unit 440 compares the collected log data with the path information of the path information database 404, and perform the function selection (classification) of the log data.

The data slicing unit 450 performs processing of cutting a time interval in which normal and abnormal states are not mixed in each selected function (processing of calculating a state change timing). Details will be described below.

The problem point identifying unit 460 performs a delay detection in the time interval cut by the data slicing unit 450, and narrows or identifies a problem point by comparison with the path information when the delay is detected.

The "functions" (or "processings") as used herein are classified as follows.

First, captured actual data is collected or data is collected by reproducing (replaying) test data by the pre-data collection unit 410, and the path analysis unit 420 classifies the path of each function of the system.

Figure 2:
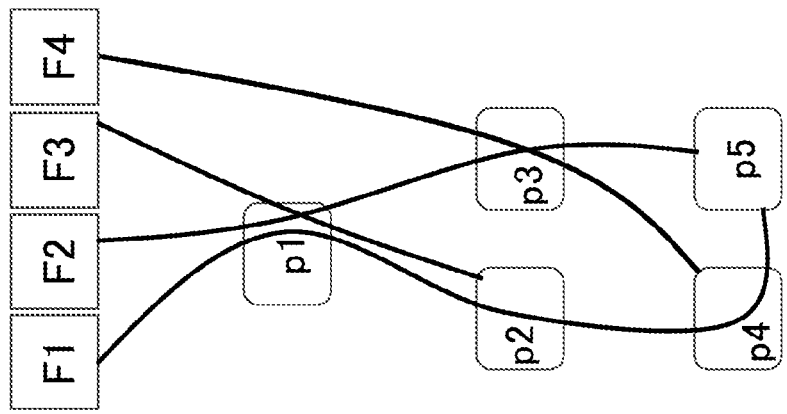
FIG. 2 is a diagram illustrating an example of a relationship between functions and components according to an embodiment.

For example, as illustrated in FIG. 2, when p1 to p5 are assumed as network components, message data flowing through the respective components p1 to p5 are analyzed, and the functions (Fi: i is a natural number) are classified by the URL+CGI parameter. It can be seen that the respective functions pass through the following paths. Note that, the components p1 to p5 may be processed as method unit or block unit of program. The term "component" may be replaced with the term "module" or "check point". Also, the "path" is positioned as a set of "components".

F1=http://foo.com/appli1.cgi?flag=|堀田 exec  path=p1-p2-p4-p5
F2=http://foo.com/appli1.cgi?flag=calc path=p1-p3-p5
F3=http://foo.com/appli1.cgi?data=true path=p1-p2
F4=http://foo.com/appli2.cgi?feature=3 path=p3-p4

When F1 and F2 are delayed more than usual, the problem point identifying unit 460 may determine in view of the analyzed path information that the paths (check points) p1, p2, p3, p4 and p5, through which F1 and F2 pass, have problem (abnormality) probability.

Also, for example, it may be determined that there are no problems in the common paths p1, p2, p3 and p4 of F1, F2 and F3 by information indicating that F3 and F4 are not delayed and path information of F3 and F4. As a result, the remaining path p5 may be diagnosed as the cause of the delay.

Note that, when the analysis target is a program, p1 to p5 may be processed as method (function) call unit, block unit, log output point unit designated by a user, or a combination thereof, as exemplarily described below.
  method (function) call unit
  p1=method1( )→p2=method2( )→p4=method3( ), . . . .
  block unit (blocks divided by if statement or { })
  p1=while( . . . )→p2=if( ) . . . →p4=else . . . .
  log output point designated by user
  p1={file=foo.java, line=35}→p2={file=foo.java, line=55}→p4={file=boo.java, line=20} etc.

As a simple example, as illustrated in FIG. 3A, the path information may express the respective functions F1 to F4 and the check points p1 to p5 in a matrix. Note that, the matrix expression is an example of processing in the analysis phase.

As illustrated in FIG. 3B, the chick points of the deteriorated functions (F1 and F2 in the example of FIG. 2) are detected by a logical sum (OR). Next, as illustrated in FIG.

3C, the check points of the non-deteriorated functions (F3 and F4 in the example of FIG. 2) are detected by OR.

Further, as illustrated in FIG. 3D, an exclusive logical sum (XOR) is performed on the result of FIG. 3B and the result of FIG. 3C. Next, a logical product (AND) is performed on the result of FIG. 3B and the result of FIG. 3D. In the present example, the result of AND is identical to that of FIG. 3D. As illustrated in FIG. 3D, p5, in which "1" remains, may be identified as the problem point, based on the result of AND.

(Analysis Phase)

Figure 4:
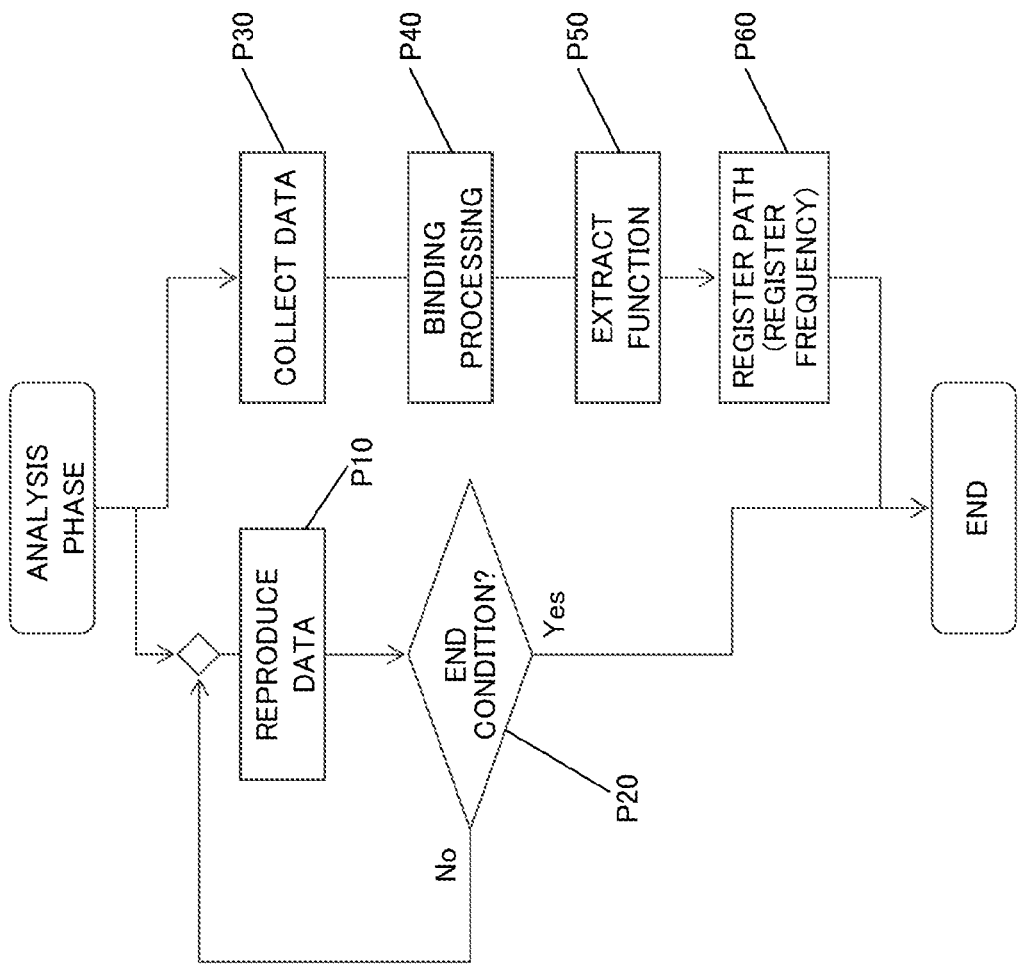
FIG. 4 is a flowchart describing an example of an operation of an analysis phase according to an embodiment.

As illustrated in FIG. 4, in the analysis phase (analysis block 401), two functions may be executed in parallel.

First, in the analysis block 401, the pre-data collection unit 410 inputs a request message to the servers 20, 30 and 40 by reproducing request data prepared in advance in the user request database 403 (data reproduction: processing P10). The processing is repeated until a predetermined end condition is satisfied (until determined as Yes in processing P20) (No route of processing P20). Note that, as the request data, those collected in the actual operation, those generated as test data, or the like may be used.

The pre-data collection unit 410 acquires data by capturing network data called by the data input in the data reproduction or by acquiring log data of the servers 20, 30 and 40 (processing P30).

Next, in the analysis block 401, for example, the path analysis unit 420 performs association processing on the acquired data and generates path information (processing P40). An example of the association processing is illustrated in FIGS. 6 and 7.

Figure 6:
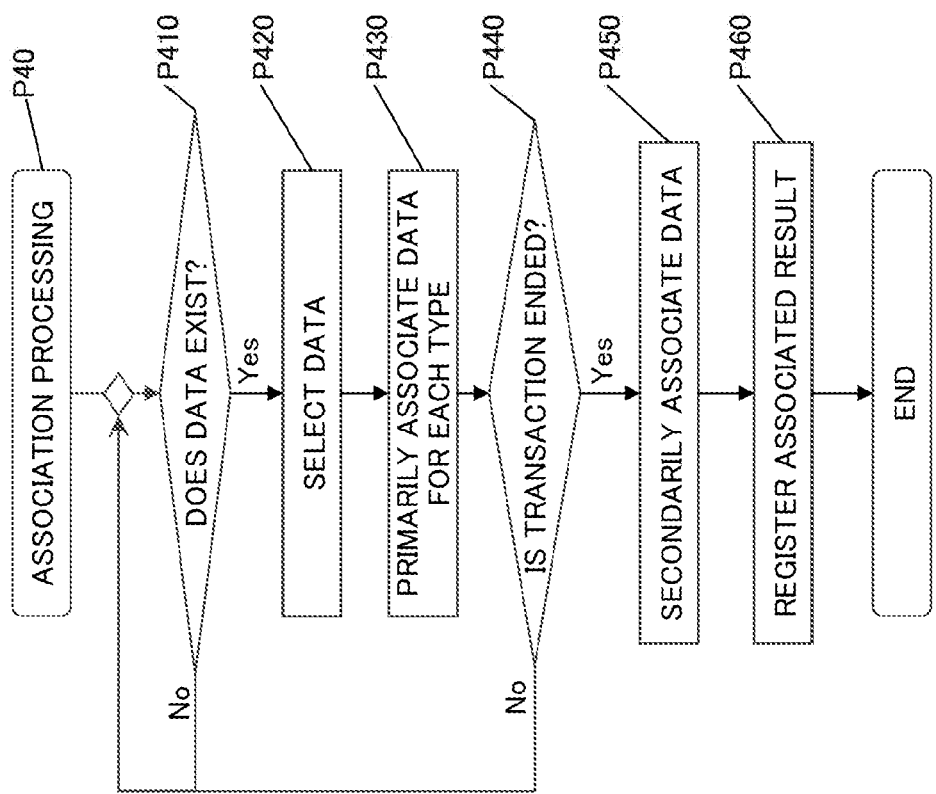
FIG. 6 is a flowchart describing an example of association processing illustrated in FIG. 4.

As illustrated in FIG. 6, the path analysis unit 420 checks whether data to be associated exist (processing P410). When the data does not exist, the path analysis unit 420 waits until data appears (No route of processing P410), and when the data exits, the path analysis unit 420 selects a data type (application or database, and the like) (processing P420 in Yes route of processing P410).

Next, the path analysis unit 420 performs primary association processing on each selected type (processing P430). Further, the path analysis unit 420 checks whether a transaction is ended (processing P440). When all constituent data types of data are provided, it is determined as the transaction end (Yes route of processing P440), and the path analysis unit 420 performs secondary association processing on all constituent data types of data by using an identification key (processing P450). Note that, processings subsequent to processing P410 are repeated until it is determined as the transaction end (No route of processing P440).

Figure 7:
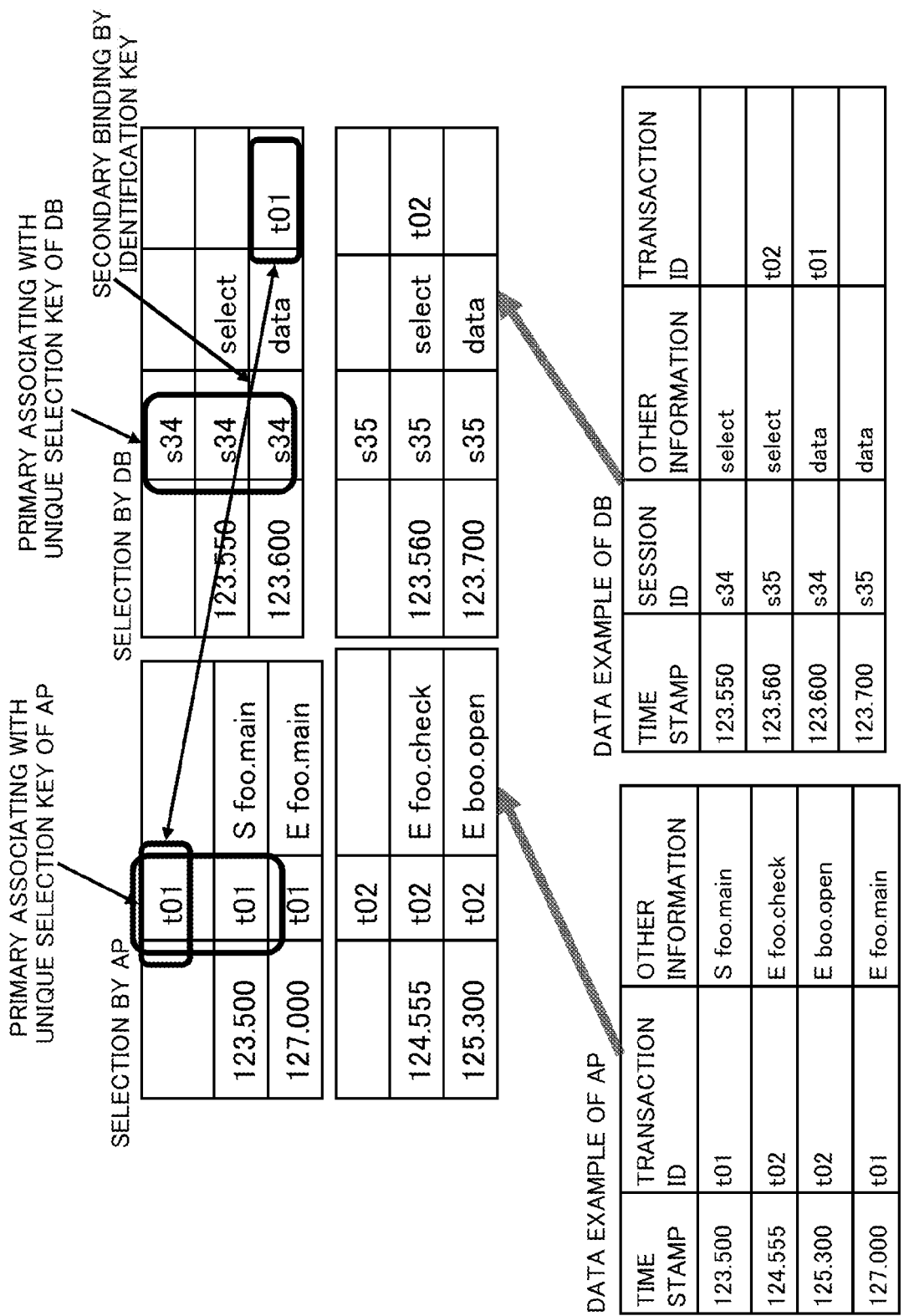
FIG. 7 is a diagram schematically describing an example of the association processing illustrated in FIG. 4.

FIG. 7 illustrates an example of the primary association processing and the secondary association processing. On the lower left side of FIG. 7, a data structure including a time stamp, a transaction ID, and other information is illustrated as a data example of the application (AP). Meanwhile, on the lower right side of FIG. 7, a data structure including a time stamp, a session ID, other information, and a transaction ID is illustrated as a data example of the database (DB).

The upper side of FIG. 7 illustrates a state in which data illustrated on the lower side of FIG. 7 are selected for each data type. Further, as illustrated on the upper side of FIG. 7, the data of the AP are primarily bound by a unique selection key of the AP (for example, the transaction ID (t01, t02, and the like), and the data of the DB are primarily associated by a unique selection key of the DB (for example, the session ID (s35, s35, and the like).

Different types of data are secondarily associated by an identification key (for example, the transaction ID (t01, t02, and the like). Note that, all data do not necessarily have identification keys that are needed for the secondary association.

When the secondary association is completed, the path analysis unit 420 registers (stores) the associated result (processing P460).

When such association processing is completed, the path analysis unit 420 performs function extraction processing as illustrated in FIG. 4 (processing P50). The function extraction processing is an example of processing of extracting and classifying the functions from the above associated result and the URL+CGI parameter.

The path analysis unit 420 registers the analysis result in the path information database 404 as the path information (processing P60). Note that, as described below, in order to improve the accuracy of the problem point identification, a method using appearance probability (frequency) information may be considered. In this case, the path analysis unit 405 stores the appearance probability information in the appearance probability information database 405 (see FIG. 1).

(Operation Phase)

Figure 5:
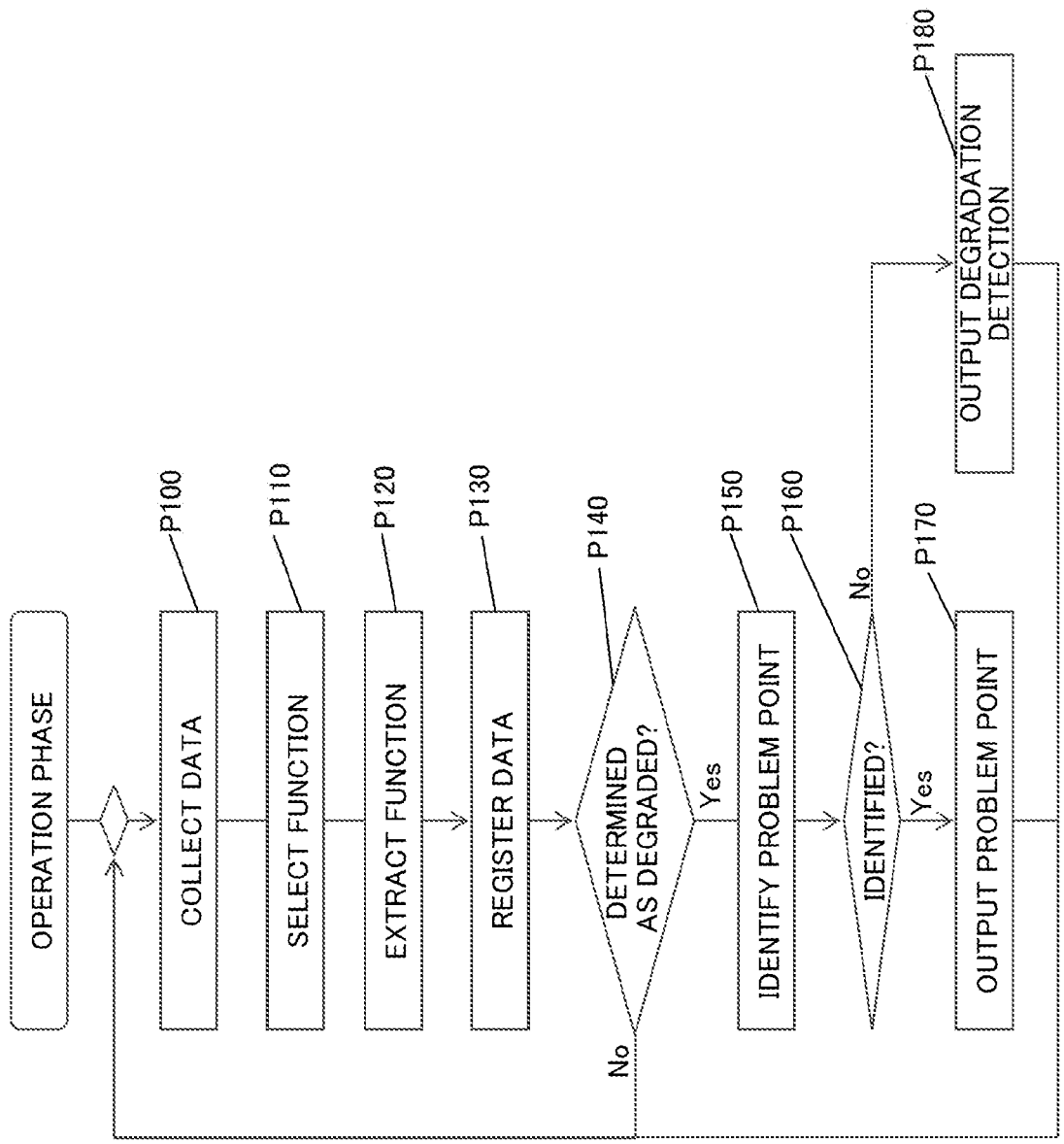
FIG. 5 is a flowchart describing an example of an operation of an operation phase according to an embodiment.

Next, an example of processing in the operation phase will be described with reference to FIG. 5.

In the operation phase (operation block 402), the operational data collection unit 430 collects information such as the URL+CGI parameter and the response time among the actual operational data from the network switch 50 or the web server 30 (processing P100) (processing P100).

Next, in the operation block 402, the function selection unit 440 selects function units from the collected data, based on the parameters such as URL, CGI, and the like (processing P110).

Further, in the operation block 402, the data slicing unit 450 performs function extraction processing, that is, processing of cutting a time interval in which normal and abnormal states are not mixed in each selected function (processing of calculating a state change timing) (processing P120). Note that, when the selected function is not included in the path information, it is applied to the function of the path information.

Thereafter, the data slicing unit 450 registers (stores) the function and response information in an analysis target data table (not illustrated) as aggregation information (processing P130). An example of a registration form is illustrated in Table 1 below.

TABLE 1

Example of registration form of analysis data table

| Function | Separation: Normal/Abnormal (Normal = 0, Abnormal = 1) | Interval ID |
| --- | --- | --- |
| F1 | 1 | 12 |
| F2 | 0 | 12 |
| F3 | 0 | 12 |
| ... | ... | ... |

In the example of Table 1 above, an entry in which data appears in an interval identified by the interval ID is registered. F3 represents that no data has existed in that interval. Note that, the interval information corresponding to the interval ID, for example, may be managed in other table (interval table) illustrated in Table 2 below. A length of the interval may be different at each slice.

TABLE 2

Example of interval table

| Interval ID | Start Time | End Time |
|---|---|---|
| 11 | 123.333 | 123.555 |
| 12 | 123.580 | 134.222 |
| ... | ... | ... |

Next, in the operation block 402, the problem point identifying unit 460 determines whether the response is degraded (processing P140). The determination may be performed in single response unit or aggregation unit.

When the response is not degraded, the operation block 402 repeats the processings subsequent to processing P100 (No route of processing P140). On the other hand, when the response is degraded (Yes in processing P140), the problem point identifying unit 460 performs the problem point identification by comparing the aggregation information and the path information (processing P150).

When the problem point identification is possible (Yes route of processing P160), the problem point identifying unit 460 outputs the information of the identified problem point on the display device or the like (processing P170). At this time, when a plurality of candidates exists, the plurality of candidates may be output after assigning priorities thereto. However, the priorities may not be assigned.

Figure 8:
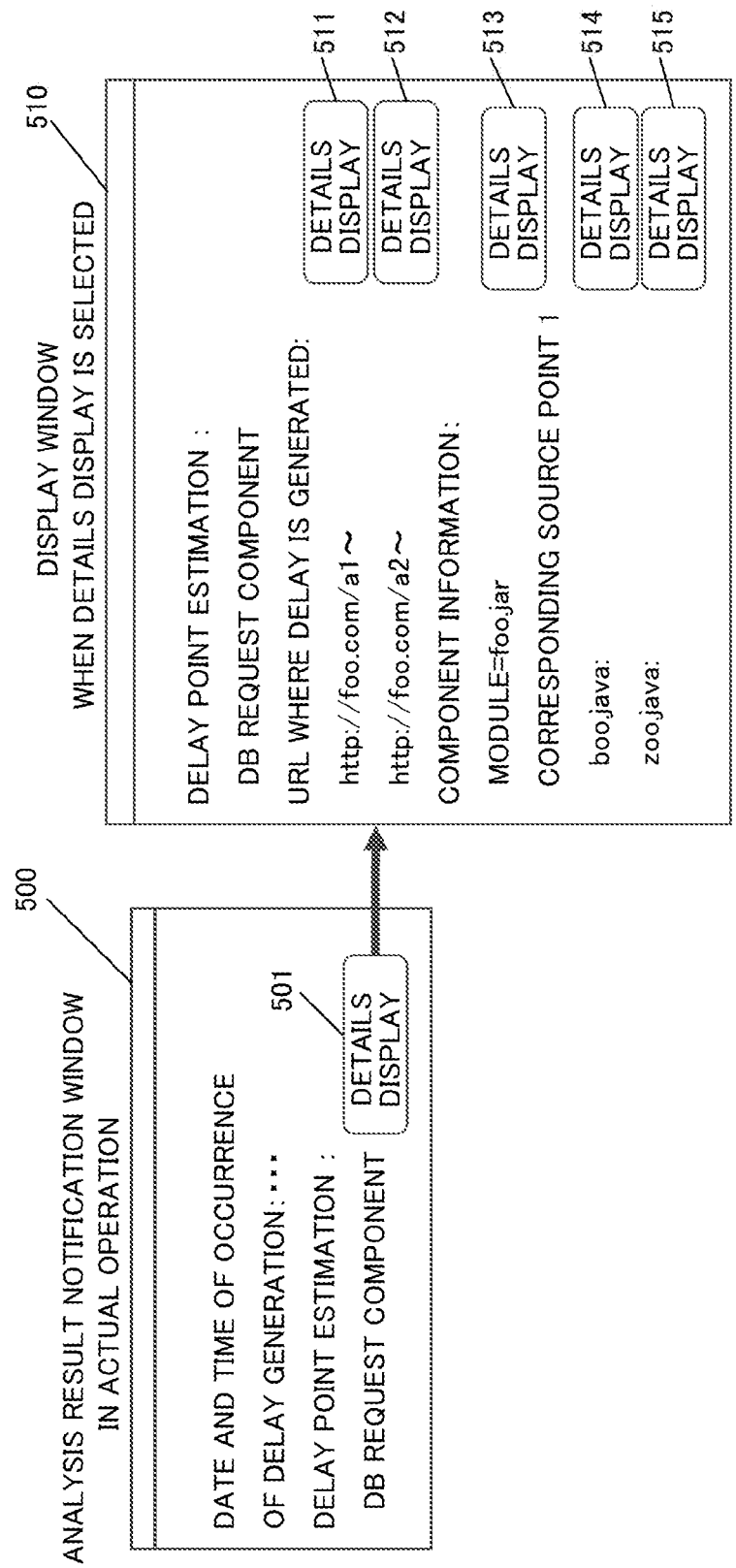
FIG. 8 is a diagram illustrating an example of an analysis result notification window of the operation phase according to an embodiment.

An example of output data is illustrated in FIG. 8. An example of an analysis result notification window 500 in the actual operation phase is illustrated on the left side of FIG. 8. For example, information such as a date and time of delay generation, an estimated delay point, and the like is displayed on the notification window 500.

Herein, when wanting to know more information about the delay point, a details display window 510 illustrated on the right side of FIG. 8 may be displayed, for example, by selecting a details display button 501 provided on the notification window 500. On the details display window 510, details display buttons 511 to 515 may also be disposed corresponding to the information to be displayed. When wanting to know more information on the details display window 510, more information may be displayed by selecting the corresponding details display buttons 511 to 515.

Figure 9:
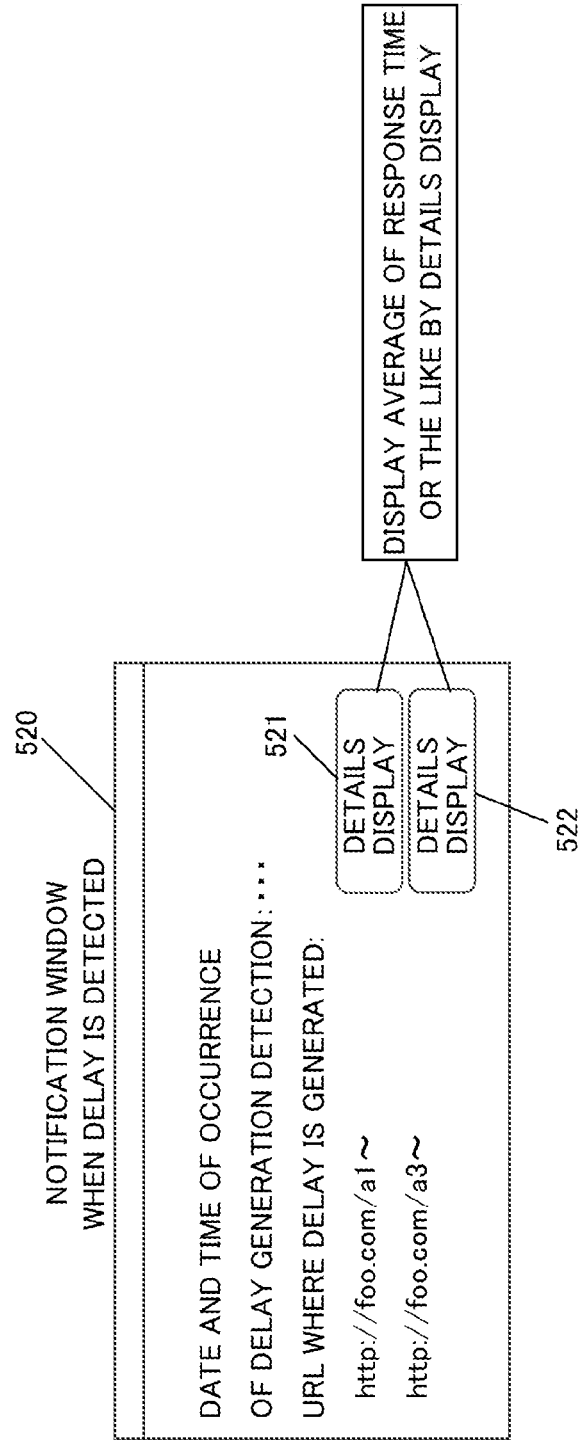
FIG. 9 is a diagram illustrating an example of a notification window when the time of delay is detected according to an embodiment.

When the problem point identification is impossible (No route of processing P160), the problem point identifying unit 460 outputs the degradation defection on the display device or the like (processing P180). When a delay is detected, an example of a notification window 520 is illustrated in FIG. 9. For example, information such as a date and time of detection of delay generation, functions (URL or the like) having detected the delay generation, and the like is displayed on the notification window 520

On the notification window 520, details display buttons 521 and 522 may be disposed corresponding to the functions having detected the delay generation. More information, for example, an average of the response time, may be displayed by selecting the details display button 521 or 522.

Next, a problem when normal and abnormal data are mixed will be described with reference to FIGS. 10 and 11.

Figure 10:
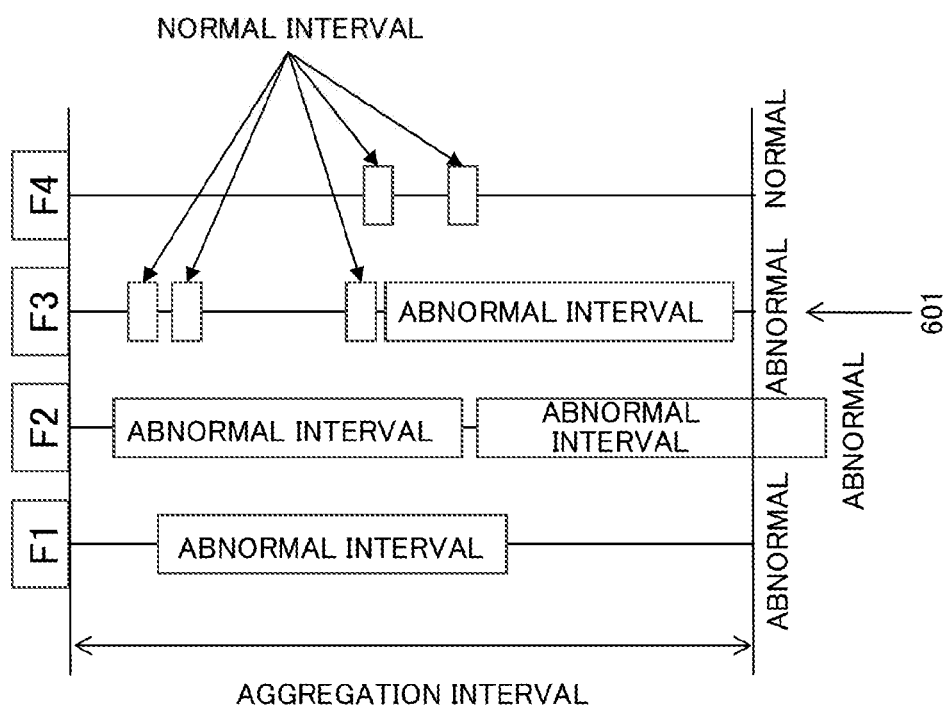
FIG. 10 is a diagram schematically illustrating a state in which normal and abnormal data are mixed in an aggregation interval of each function according to an embodiment.
Figure 11:
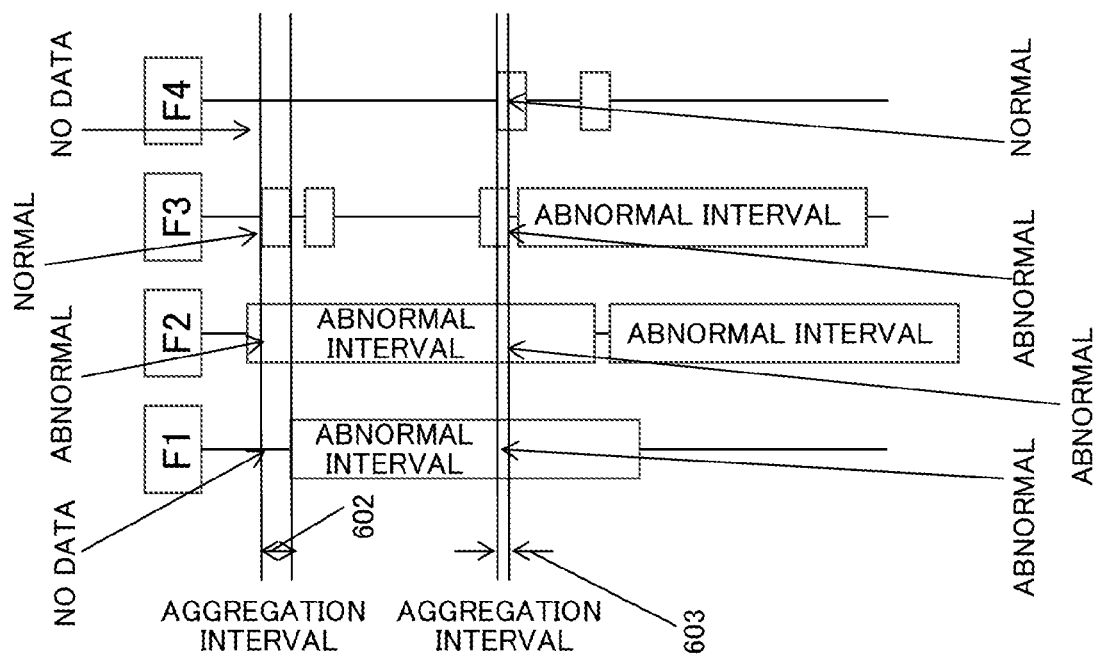
FIG. 11 is a diagram schematically describing an example of a problem when the aggregation interval is minimized in FIG. 10.

In FIGS. 10 and 11, "abnormal interval" illustrates "time interval of abnormal data", and "normal interval" illustrates "time interval of normal data". The "abnormal data", for examples, refers to data representing that a response time is longer than a normal range, and the "normal data", for example, refers to data representing that a response time is within a normal range.

Even in the same functions, normal data and abnormal data may be mixed depending on timings. In that case, the aforementioned narrowing using the matrix cannot be performed.

For example, when a threshold value of the response time is 1 second (abnormal if equal to or more than 1 second, and normal if less than 1 second), the analysis may not be accurate even if the average 1 second is determined as abnormal (see, for example, an arrow 601 of FIG. 10). As such, when there is a problem caused by a dedicate matter of timing, a correct determination may not be made because the determination result becomes either normal or abnormal on average. Also, when response times of the plurality of functions (F1, F2, ... ) are all around the threshold value, the analysis result may be never reliable.

Note that, since the technique of Patent Document 1 is a detection of a malfunction of a network equipment, a normal state and an abnormal state are clearly divided (the mixture of normal/abnormal data is not considered).

Therefore, in the present embodiment, the narrowing can be enabled by automatically cutting the region (time interval) in which the normal and abnormal states are not mixed.

As an example of the basic processing, first, a timing of a change of the normal and abnormal states is calculated by each URL, and a time interval in which the normal and abnormal states are not mixed is separated by each URL, based on the corresponding timing. In a range where each time interval is superimposed, a matrix is made and an operation is performed (an abnormal module being a problem point is calculated (detected), based on "relationship information" between the plurality of processings (or functions) and the modules).

Note that, the "relationship information" may be appropriately updated. For example, the request data in the actual operation phase is stored in the user request database 403, and when unknown data having not appeared in the pre-analysis phase appears in the actual operation phase, the "relationship information" is updated by performing the pre-analysis again by using the stored request data.

However, if the interval in which the normal and abnormal states are not mixed in one URL is cut by a plurality of URLs, the interval is cut into too small pieces and thus combinations (computation time) become enormous. Therefore, among processings exemplified in the following (a) to (c), the abnormal point narrowing is performed by only (a), (a)+(b), (a)+(c), or (a)+(b)+(c).

(a) A slice that does not include an abnormal state is excluded.

(b) An operation is performed by selecting a slice that covers more points (components) (for example, since the component used by the URL is already known (analyzed), a slice including more components by combination is selected. Candidates of the combination are prepared by previously calculating "can most components be included if which combination of URLs is covered".

(c) A slice that covers more URLs is selected and an operation is performed.

(Solution to Minimize Aggregation Interval)

Although wanting to make the corresponding operation applicable by adjusting the aggregation interval, effective data cannot be found by merely shortening the aggregation interval. If the aggregation interval is excessively shortened, functions (URLs) appearing at the same time are reduced and thus the analysis is not effective. Also, if data suitable for the analysis in various durations are found while changing the duration, the combinations are exploded and an estimate of a computation amount becomes impossible.

For example, as indicated by reference numeral 602 in FIG. 11, when the aggregation interval is shortened, data necessary for the determination (in this case, F1, F2, F3 and F4) are incomplete. Also, as indicated by reference numeral 603 in FIG. 11, when the aggregation interval is more shortened and the search is performed while sliding the corresponding aggregation interval, the interval necessary for the analysis may be found by change according to timings. However, the combinations become infinite and the computation time is lacking.

(Determination in Superimposed Manner by Separating Normal Interval and Abnormal Interval)

Figure 12:
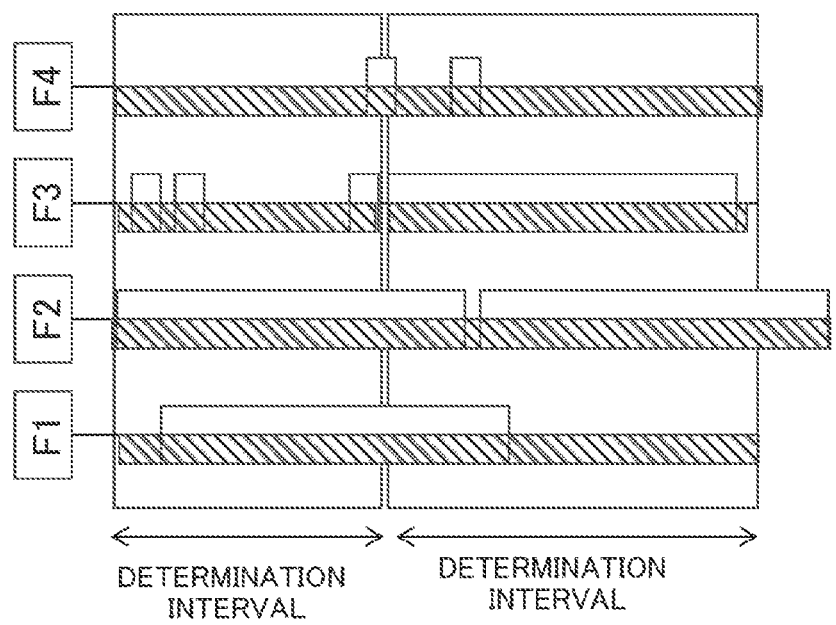
FIG. 12 is a diagram schematically describing a state in which a normal interval and an abnormal interval in FIG. 10 are divided and determined in a superimposed manner.

In the present embodiment, for example, as illustrated in FIG. 12, the normal interval and the abnormal interval are divided at each function (for example, URL), and the superimposed region of the intervals is used for analysis. Therefore, analyzable data can be found with suppressing a computation amount, and analysis accuracy is improved. Note that, in FIG. 12, the functions F1 and F4 are assumed that similar abnormal or normal data exist before and after temporally. Further, FIG. 12 illustrates a state in which the interval (determination interval) is divided into two intervals by data of the function F3.

(Case Example in Business Processing System)

A problem occurring when a new service (airline ticketing system) of a business processing system is provided will be described with reference to FIGS. 13 and 14.

Figure 13:
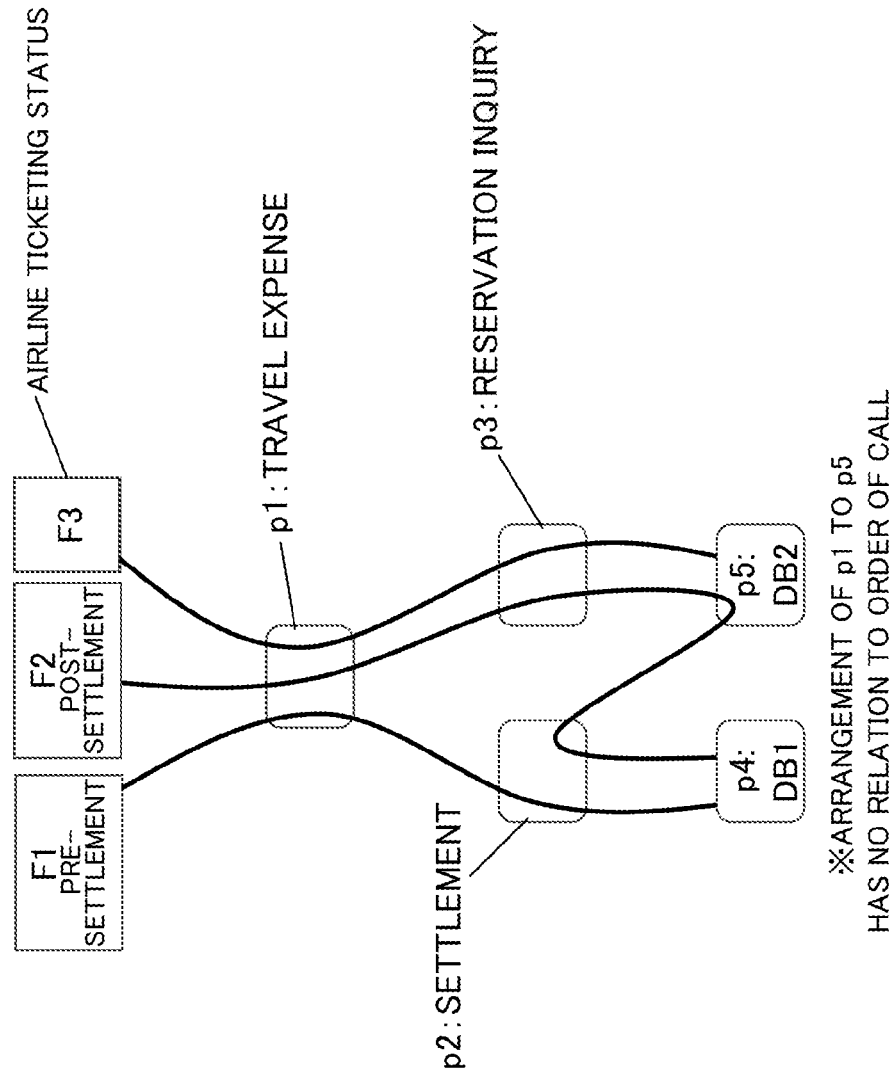
FIG. 13 is a diagram describing a case example of a business processing system according to an embodiment.

FIG. 13 illustrates a state in which functions (F1, F2 and F3) and paths are set as described below.

F1=pre-settlement path=p1 (travel expense)-p2 (settlement)-p4 (DB1)

F2=post-settlement path=p1 (travel expense)-p3 (reservation inquiry)-p5 (DB2)-p2 (settlement)-p4 (DB1)

F3=airline ticketing status path=p1 (travel expense)-p3 (reservation inquiry)-p5 (DB2)

There has been no problems at the beginning of the system operation, but slowdown of the system occurred after one month. The direct cause is the increase in the load of the reservation inquiry (p3) by the airline ticketing status (F3) and the post-settlement (F2) because the search of all cases is performed in the reservation inquiry (p3) and the reservation inquiry (p3) is performed regardless of the existence and non-existence of the airline ticketing in the post-settlement (F3) of the travel expense.

Since an operator cannot imagine the increase in the load of the airline reservation inquiry (p3) due to the post-settlement, it has taken a long time to separate problems.

(Occurrence of Symptom in Business Processing System)

Figure 14:
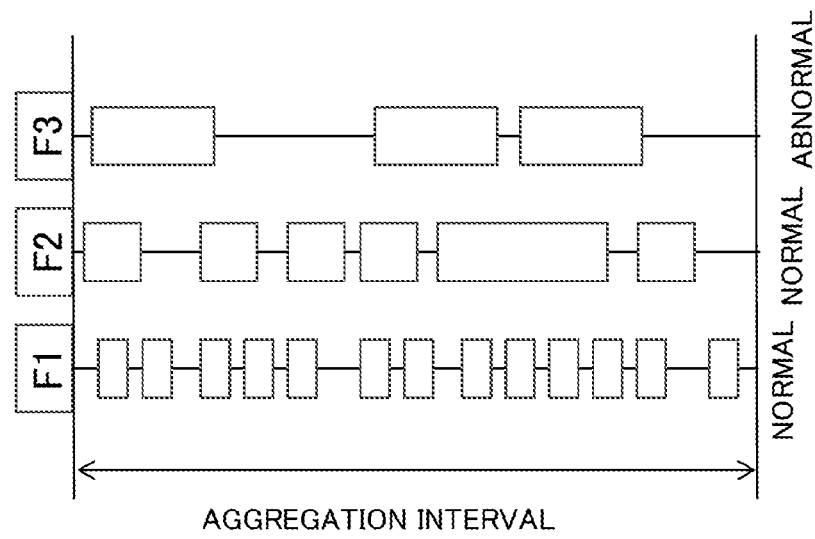
FIG. 14 is a diagram schematically describing an example of an abnormal development in the business processing system illustrated in FIG. 13.

For example, as illustrated in FIG. 14, in a usual aggregation interval, since F1, F2 and F3 are classified into F1=normal, F2=normal, and F3=abnormal, the analysis is not correctly performed. If F1=normal, F2=abnormal, and F3=abnormal, the determination is possible.

(Diagnosis by the Present Embodiment)

Advance Preparation

Figure 16:
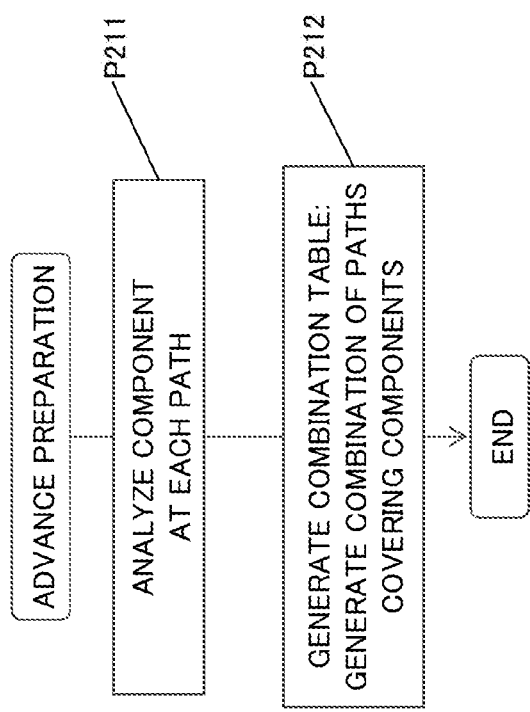
FIG. 16 is a flowchart describing advance preparation processing according to an embodiment.

First, the path analysis unit 420 (see FIG. 1) of the pre-analysis block 401 classifies the businesses and/or functions by URL (+argument) (F1 to F3), and sets path information at each classified business and/or function (processings P211 and P212 of FIG. 16). For example, as described below, the components p1 to p5 are set at each of the functions F1 to F3.

F1=http://foo/ . . . pre-settlement:p1-p2-p4
F2=http://boo/ . . . post-settlement:p1-p2-p3-p4-p5
F3=http://bar/ . . . airline ticketing status:p1-p3-p5

Overview of Diagnosis

In a case where F1 is normal and F2 and F3 are delay, abnormal components are diagnosed. In a case where F2 and F3 are abnormal, it may be determined from the path information of F2 and F3 that there is a probability that p1, p2, p3, p4 and p5 (that is, all components in the case of the present example) are abnormal. Herein, since F1 is normal, the probability that p1, p2 and p4 are abnormal from the path information of F1 is excluded.

As a result, p3 (reservation inquiry) and p5 (DB2) are diagnosed as the cause of the delay. Note that, with respect to the abnormal components primarily separated by the diagnosis, a prompt attention is enabled by automatically performing additional monitoring or analysis.

Figure 17:
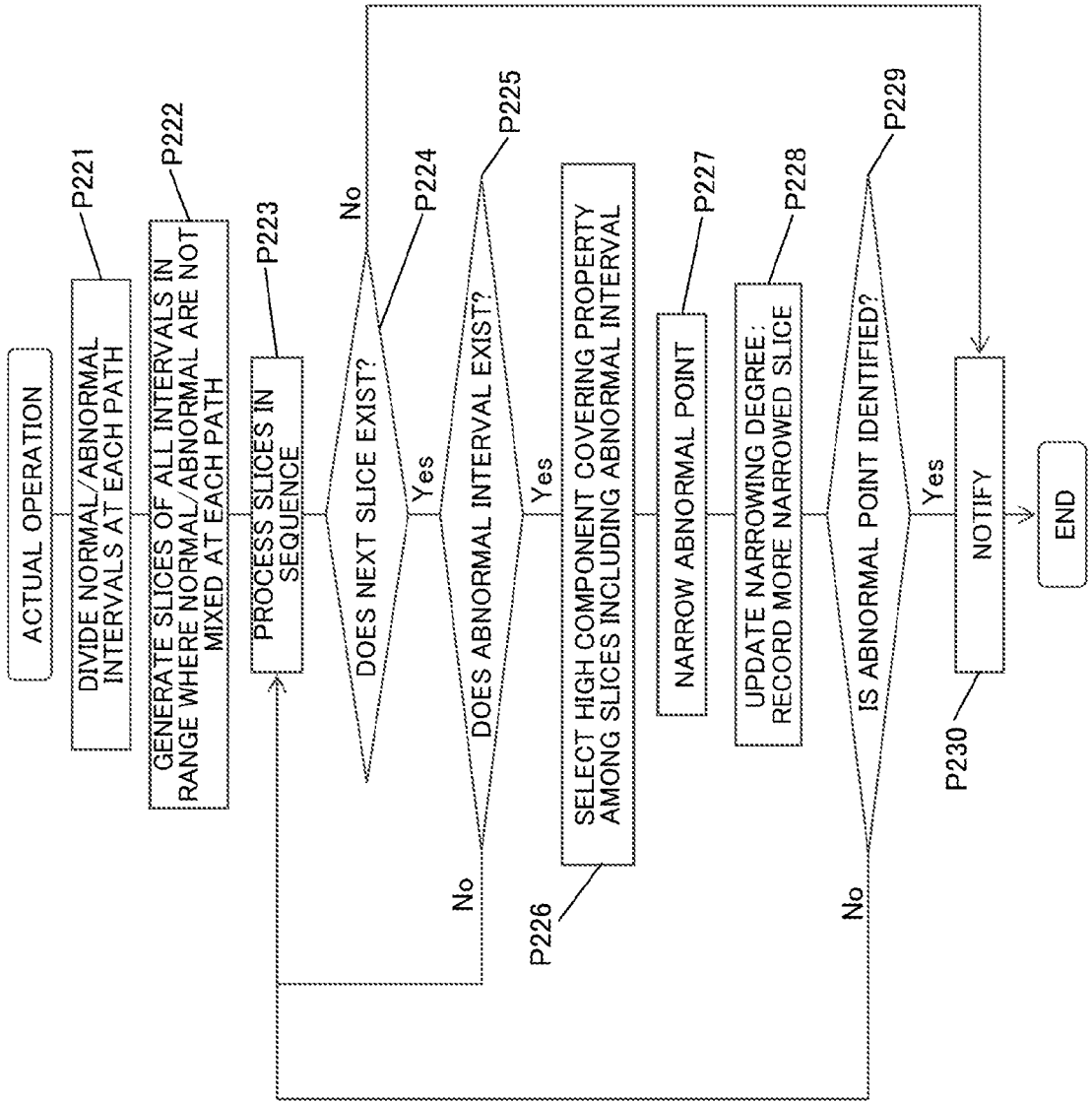
FIG. 17 is a flowchart describing an example of an operation in an operation phase according to an embodiment.

FIG. 17 illustrates an example of processing flow in the actual operation phase.

First, the data slicing unit 450 classifies the normal interval and the abnormal interval at each path (processing P221), and generates slices of all intervals in a range where the normal interval and the abnormal interval are not mixed at each path (processing P222).

Next, the problem point identifying unit 460 (see FIG. 1) processes the slices in sequence (processing P223). The problem point identifying unit 460 checks whether a next slice exists (processing P224). When the next slice exists (Yes in processing P224), the problem point identifying unit 460 determines whether an abnormal interval exists in the corresponding slice (processing P225). When the abnormal interval exists (Yes in processing P225), the problem point identifying unit 460 selects a slice having a high component coverage among the slices including the abnormal interval (processing P226), and narrows the abnormal point (processing P227).

The problem point identifying unit 460 updates a narrowing degree and records a more narrowed slice (processing P228). Next, the problem point identifying unit 460 determines whether the abnormal point can be identified (processing P229). When the abnormal point can be identified (Yes in processing P229), the problem point identifying unit 460 performs notification processing for example, by displaying information of the identified abnormal point on the display device or the like (processing P230).

Note that, when the abnormal interval is not included in the slice (No in processing P225) or when the abnormal point cannot be identified (No in processing P229), all processings proceed to processing P223. Meanwhile, when the next slice does not exist (No in processing P224), the notification processing is performed.

(Application to Business Processing System)

Figure 15:
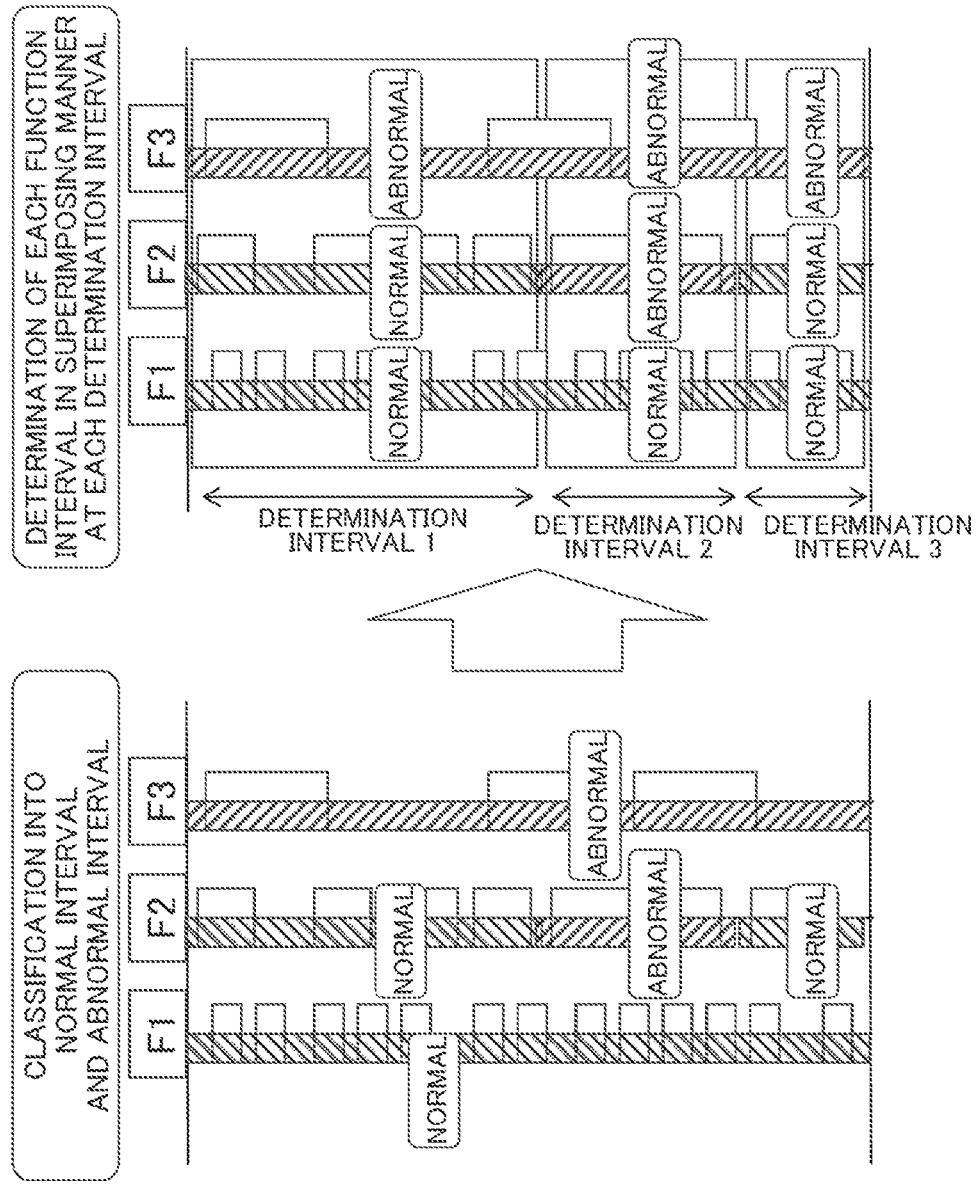
FIG. 15 is a diagram schematically describing a case where the analysis method according to the embodiment is applied to the business processing system.

For example, as illustrated in FIG. 15, the normal interval and the abnormal interval are classified, and the determination is performed on each function interval in a superimposed manner at each determination interval. In the case of FIG. 15, "determination interval 1"="normal, normal, abnormal", "determination interval 2"="normal, abnormal, abnormal", and "determination interval 3"="normal, normal, abnormal". In this case, by the analysis on the region (range) of the "determination interval 2", p3 (reservation inquiry) and p5 (DB2) are narrowed as the problem points.

(Method of Classifying Normal Interval and Abnormal Interval)

A sparse case where the normal interval and the abnormal interval exist in a sparse manner and a superimposed case where the normal interval and the abnormal interval exist in a superimposing manner may be considered.

(Sparse Case)

In the sparse case, classification by the following methods may be considered.

Figure 18:
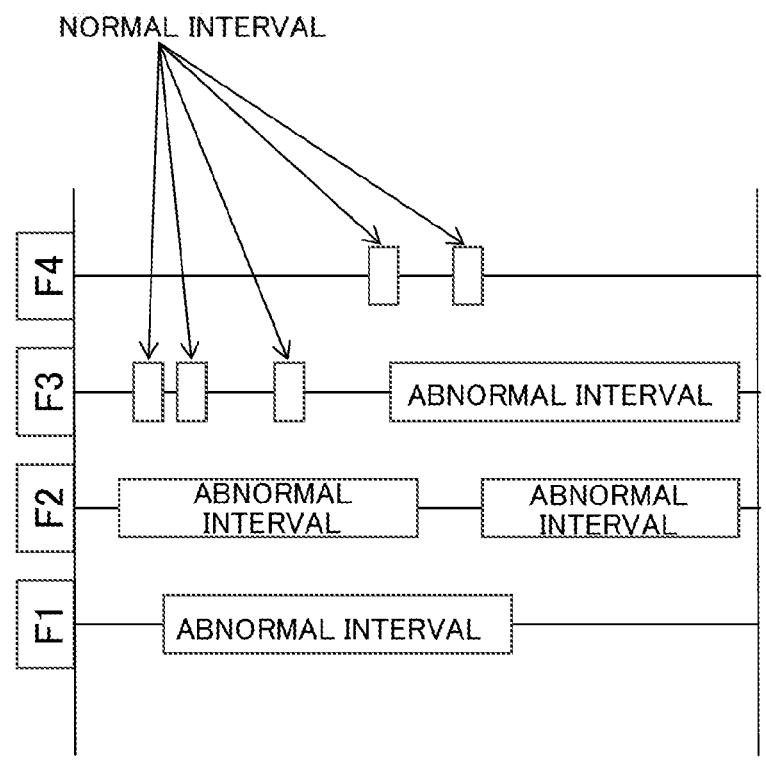
FIG. 18 is a diagram illustrating a state in which unit of request-response data (RR data) is set as a determination interval in an embodiment.

(Method 1) A request-response data (hereinafter, referred to as "RR data") unit is set as the determination interval (see FIG. 18). In other words, interval of RR data=normal interval or abnormal interval. Note that, in FIG. 18, data of the normal interval or the abnormal interval indicated by a rectangle corresponds to RR data.

Figure 19:
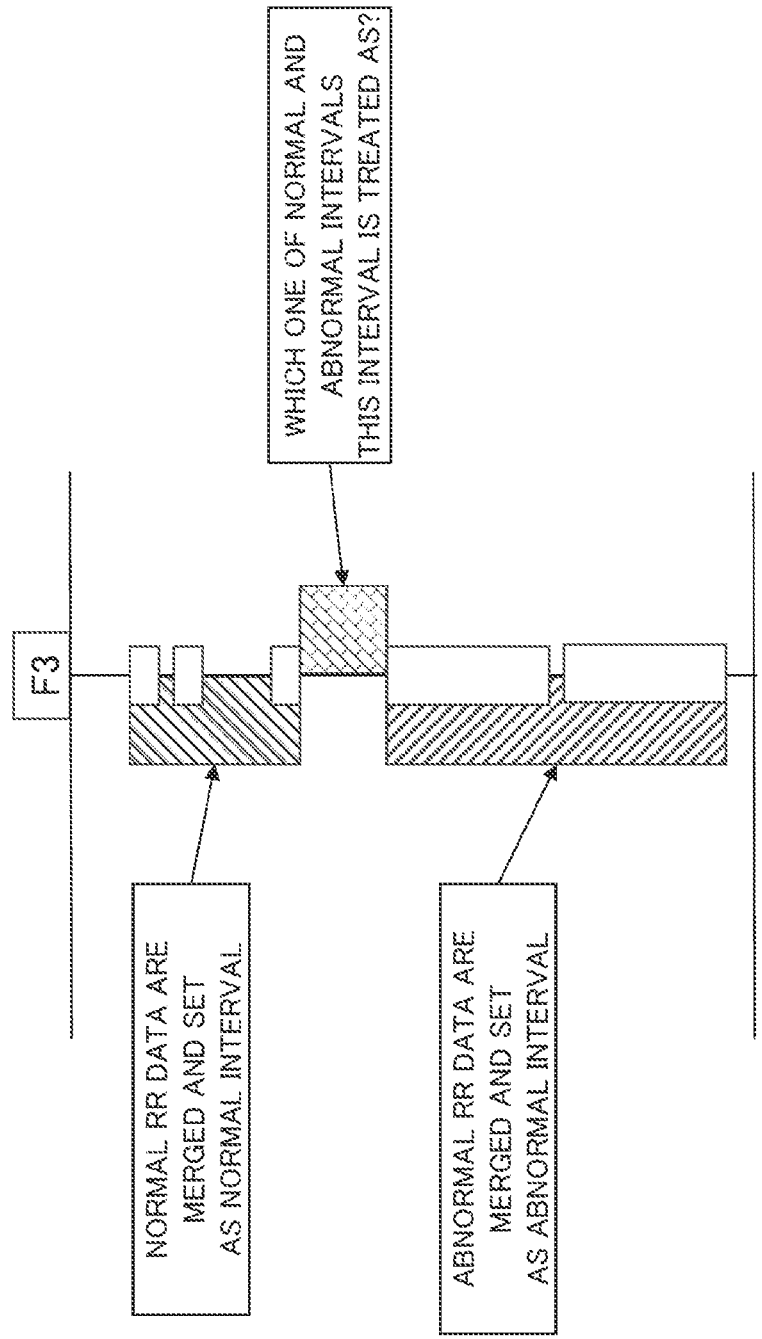
FIG. 19 is a diagram illustrating a state in which normal RR data are merged and set as a normal interval, and abnormal RR data are merged and set as an abnormal interval.

(Method 2) The normal RR data are merged and set as the normal interval, and the abnormal RR data are merged and set as the abnormal interval (see FIG. 19). As compared with the method 1, the number of the intervals can be suppressed, and thus, the processing time can be reduced. In FIG. 19, several methods of determining into which one the RR data non-existence interval of the switch of the normal interval and the abnormal interval is incorporated may also be considered (depending on the setting).

Figure 20:
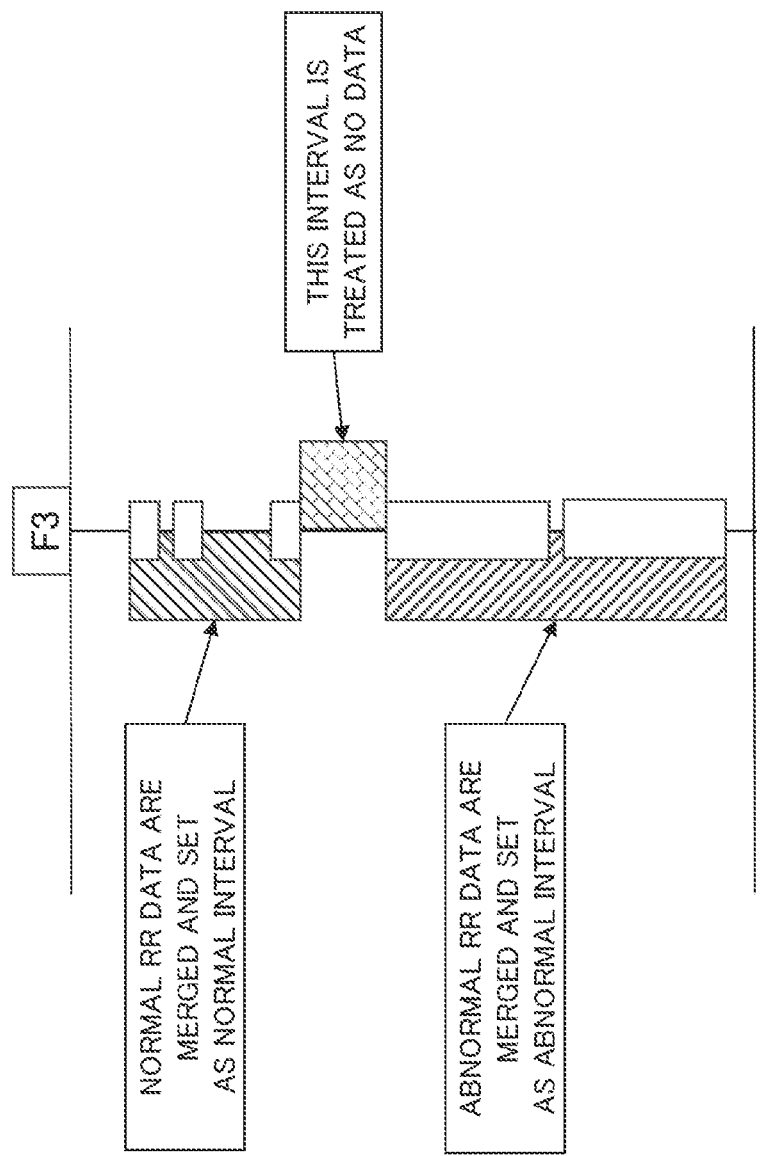
FIG. 20 is a diagram illustrating a state in which an interval where RR data of switch of the normal interval and the abnormal interval does not exist is treated as no data in an embodiment.

(Method 2-1) The RR data non-existence interval of the switch of the normal interval and the abnormal interval is neither normal nor abnormal and is treated as "no data" (see FIG. 20). The present method 2-1 is used when wanting to find the normal/abnormal intervals strictly.

Figure 21:
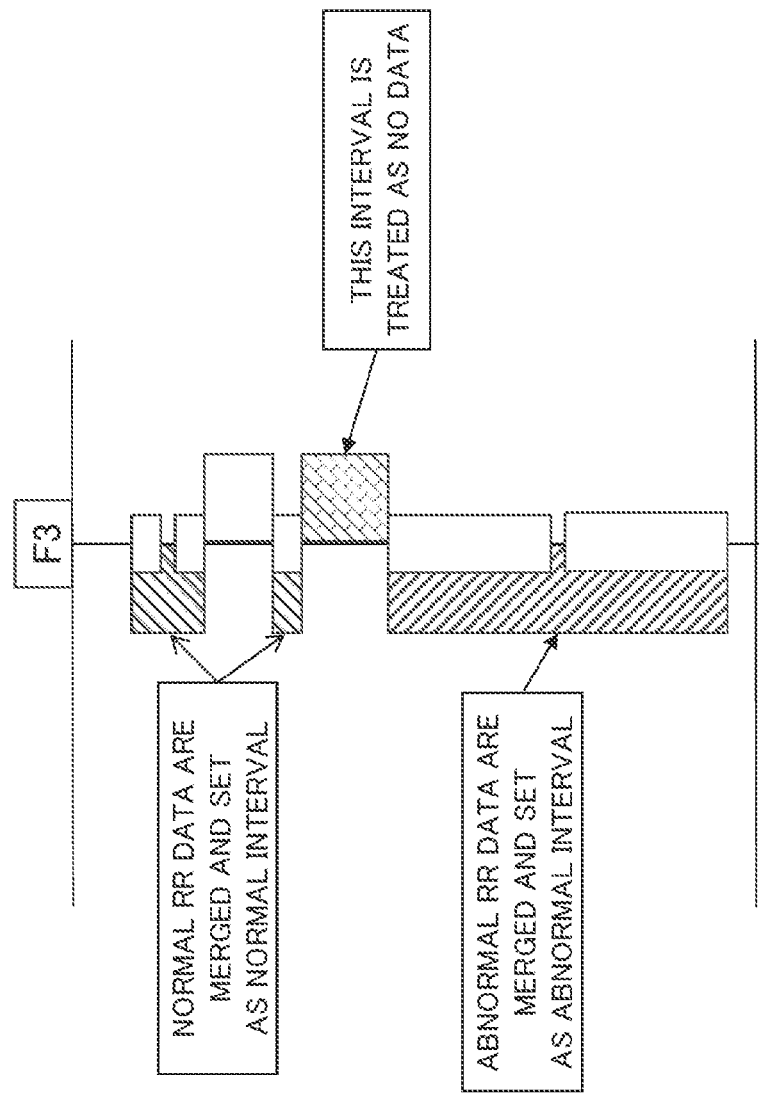
FIG. 21 is a diagram illustrating a state in which an interval where RR data of switch of the normal interval and the abnormal interval does not exist is treated as no data in an embodiment.

(Method 2-1') Like the above method 2-1, the RR data non-existence interval exceeding the threshold values of the normal interval and the abnormal interval is treated as "no data" (see FIG. 21). The threshold value in the case of being treated as "no data" may use an average value of the normal/abnormal RR data, or may use a threshold time determining as normal/abnormal.

Figure 22:
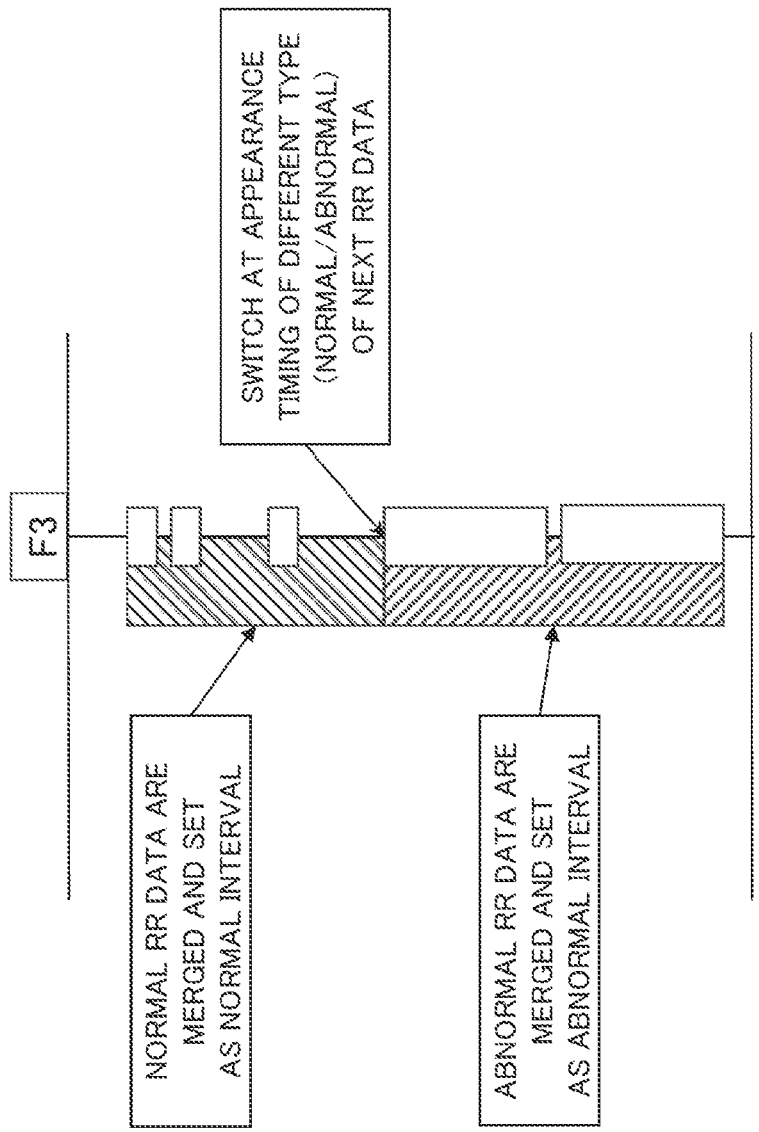
FIG. 22 is a diagram illustrating a state in which an interval is switched at a timing where next RR data of switch of the normal interval and the abnormal interval appears in an embodiment.

(Method 2-2) The interval may be switched at a timing where next RR data of the switch (different type (normal/abnormal)) of the normal interval and the abnormal interval appears (see FIG. 22).

Figure 23:
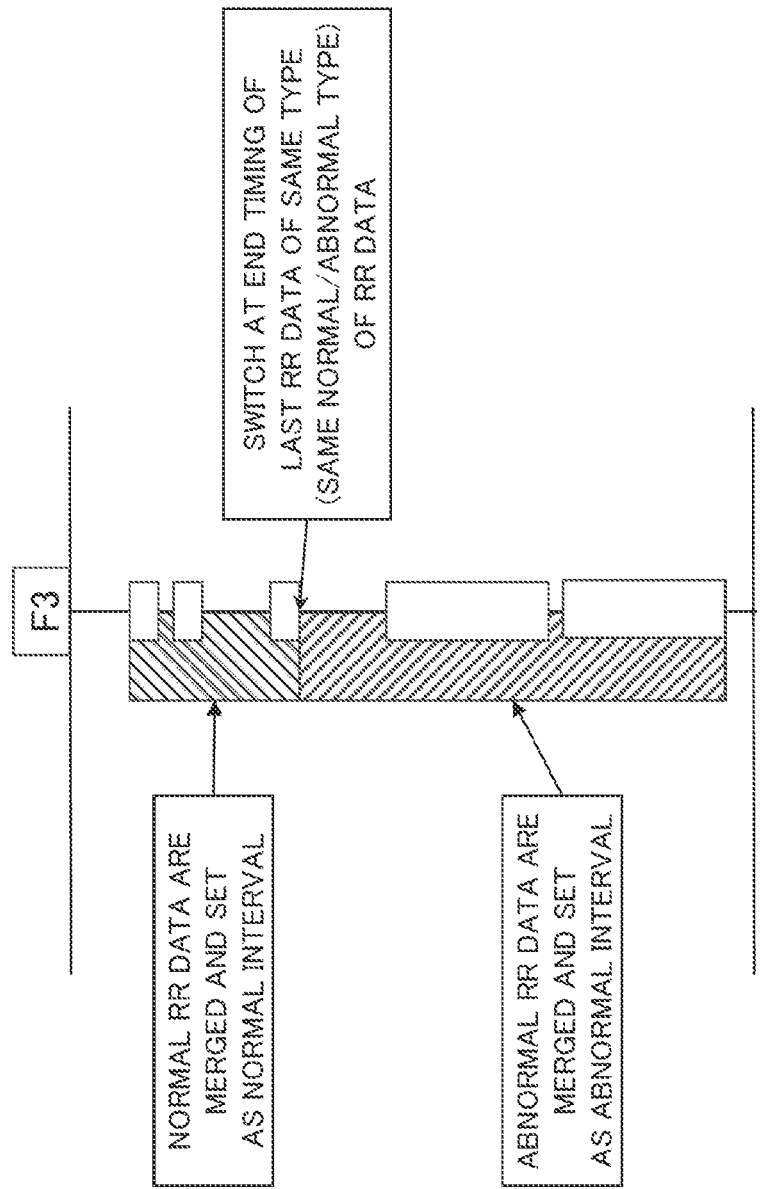
FIG. 23 is a diagram illustrating a state in which an interval is switched at an end timing of the last RR data of the same type of RR data in an embodiment.

(Method 2-3) The interval is switched at an end timing of the last RR data of the same type (same normal/abnormal type) of RR data (see FIG. 23).

Figure 24:
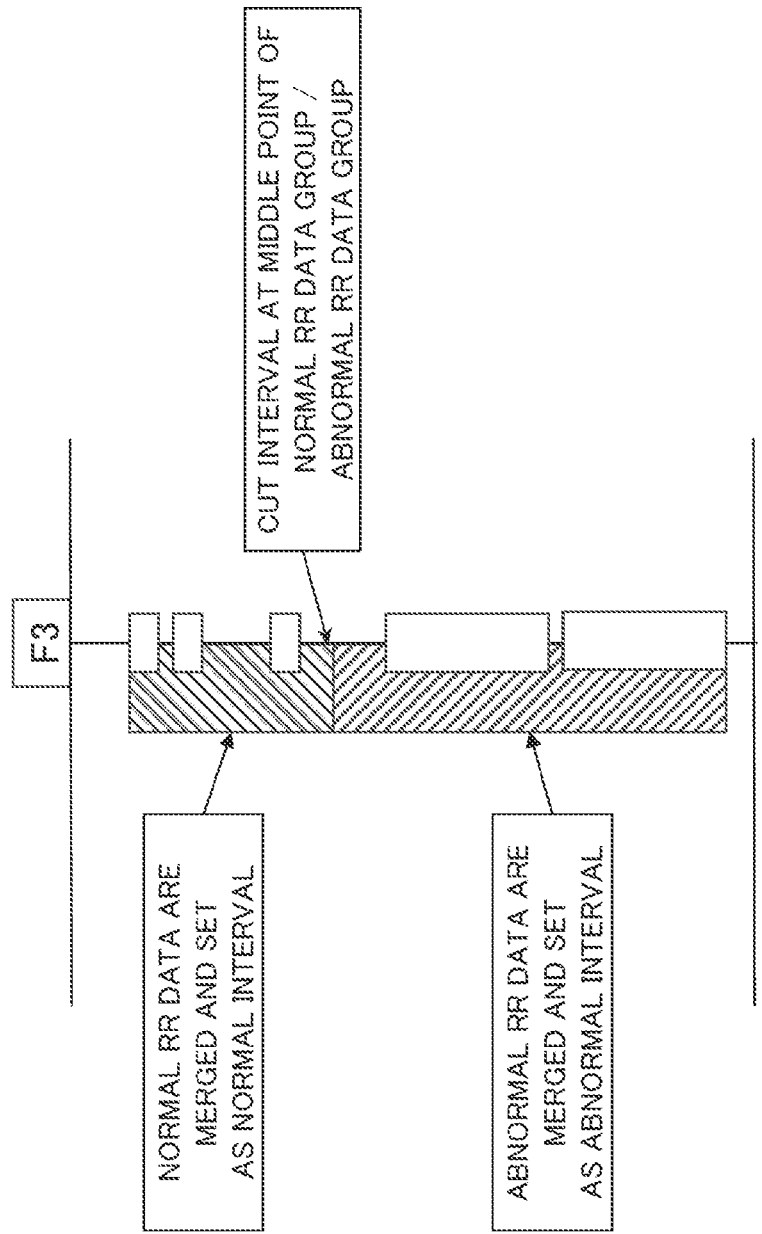
FIG. 24 is a diagram illustrating a state in which a switching is performed at a middle point of a normal RR data group and an abnormal RR data group.

(Method 2-4) The interval is switched at a middle point of the normal RR data group and the abnormal RR data group (see FIG. 24). Note that, the middle point is a non-limiting example and may be a middle of the data non-existence interval or a point separated by an average value of the normal RR data.

Basically, the method 2-1 or the method 2-1' is used, and a case where the RR data non-existence interval is long may be treated as "no data". This is because a correct result is not obtained even when identification processing is performed using the matrix based on ambiguous information (even when data does not exist, it is treated as normal). However, in a case where RR data are too small and interval information necessary for analysis is incomplete, identification processing may be performed at the expense of accuracy, for example, by loosening the threshold value.

(Superimposed Case)

Figure 25:
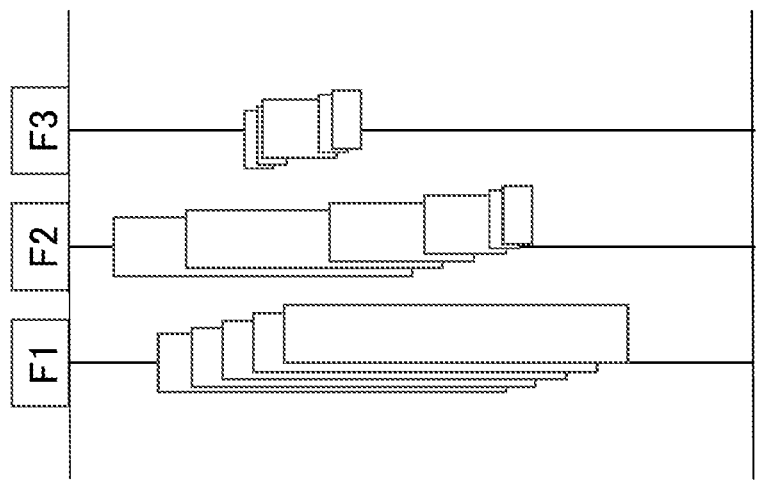
FIG. 25 is a diagram illustrating a state of a case where RR data are superimposed in an embodiment.
Figure 26:
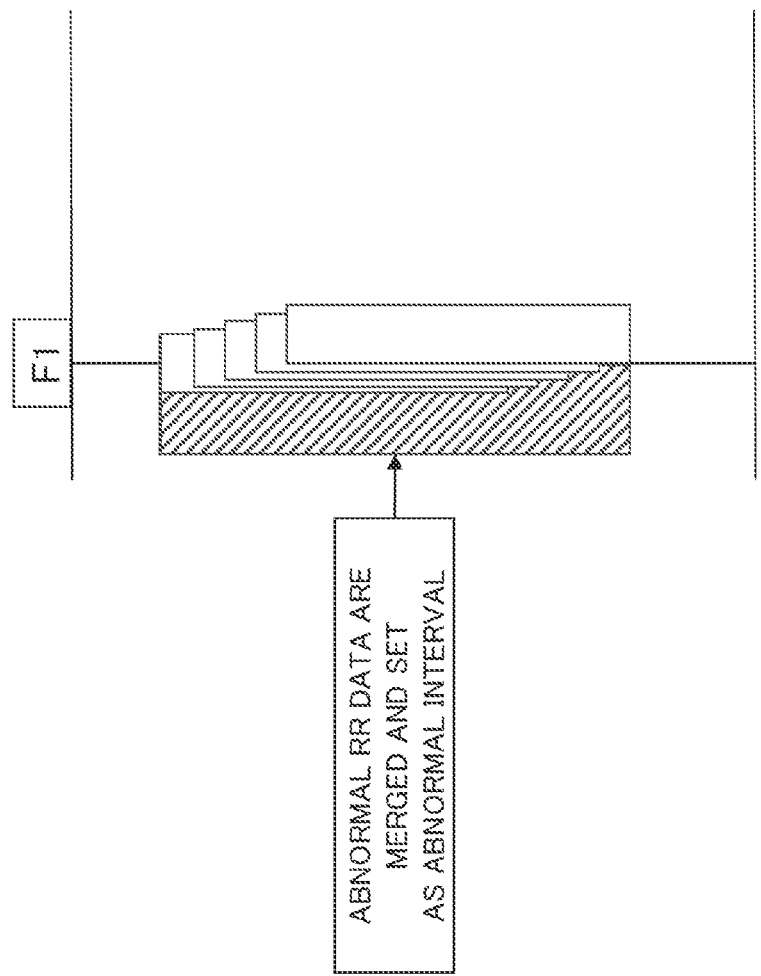
FIG. 26 is a diagram illustrating a state in which an interval from the start to the end of the same type of RR data is set as one normal interval or abnormal interval in an embodiment.

When the RR data are superimposed as illustrated in FIG. 25, the interval from the start to end of the same type of the RR data is basically set as one normal interval or abnormal interval as illustrated in FIG. 26.

Figure 27:
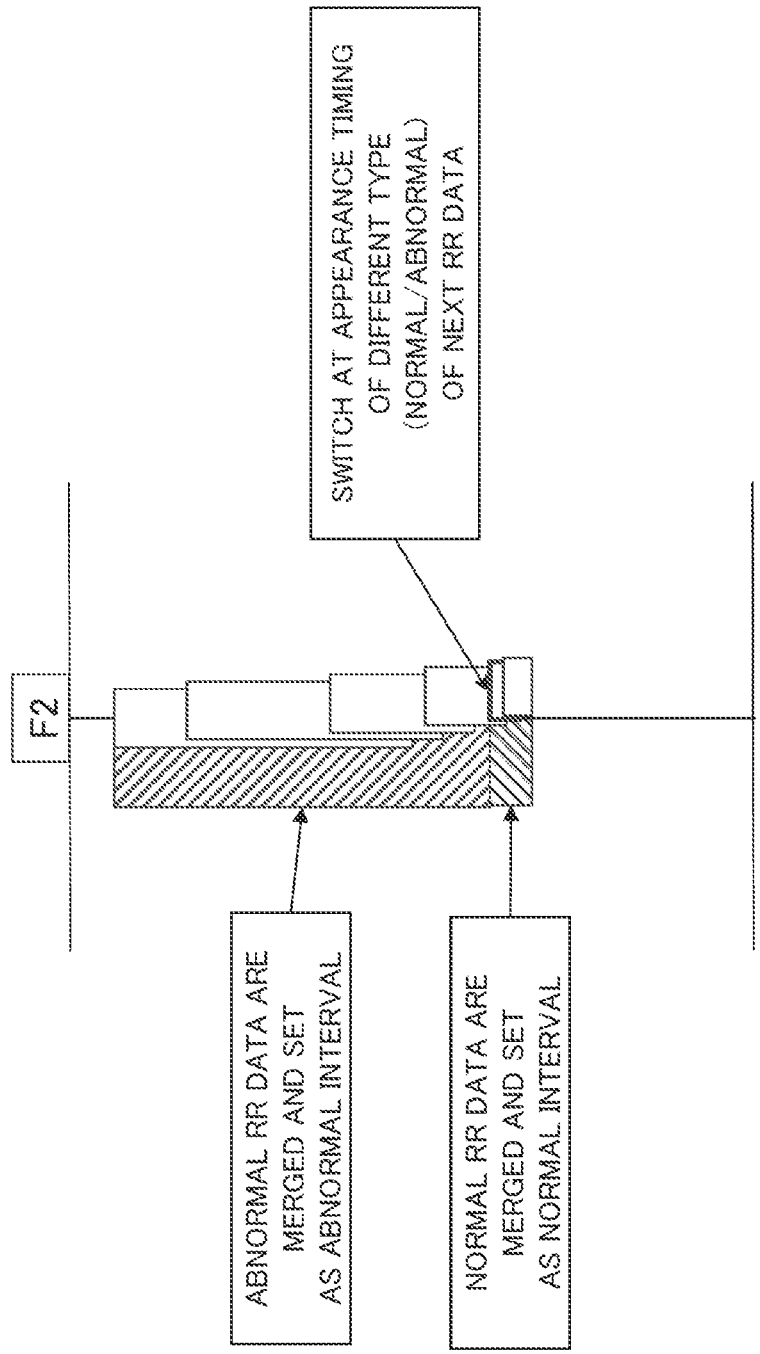
FIG. 27 is a diagram illustrating a state in which an interval is separated at a start timing (appearance timing) of different types of next RR data in an embodiment.

(Method 1) The interval is separated at a start timing (appearance timing) of different types (normal/abnormal) of next RR data (see FIG. 27). In typical cases, a delay is generated in one processing by a certain cause (for example, lock of a DB), and another processing is waited by the processing. Hence, likewise, a delay is also generated in another processing. The present method 1 is based on the assumption that when the cause of delay of the basic processing is solved, the other processings are immediately ended, and subsequent RR data are normal.

Figure 28:
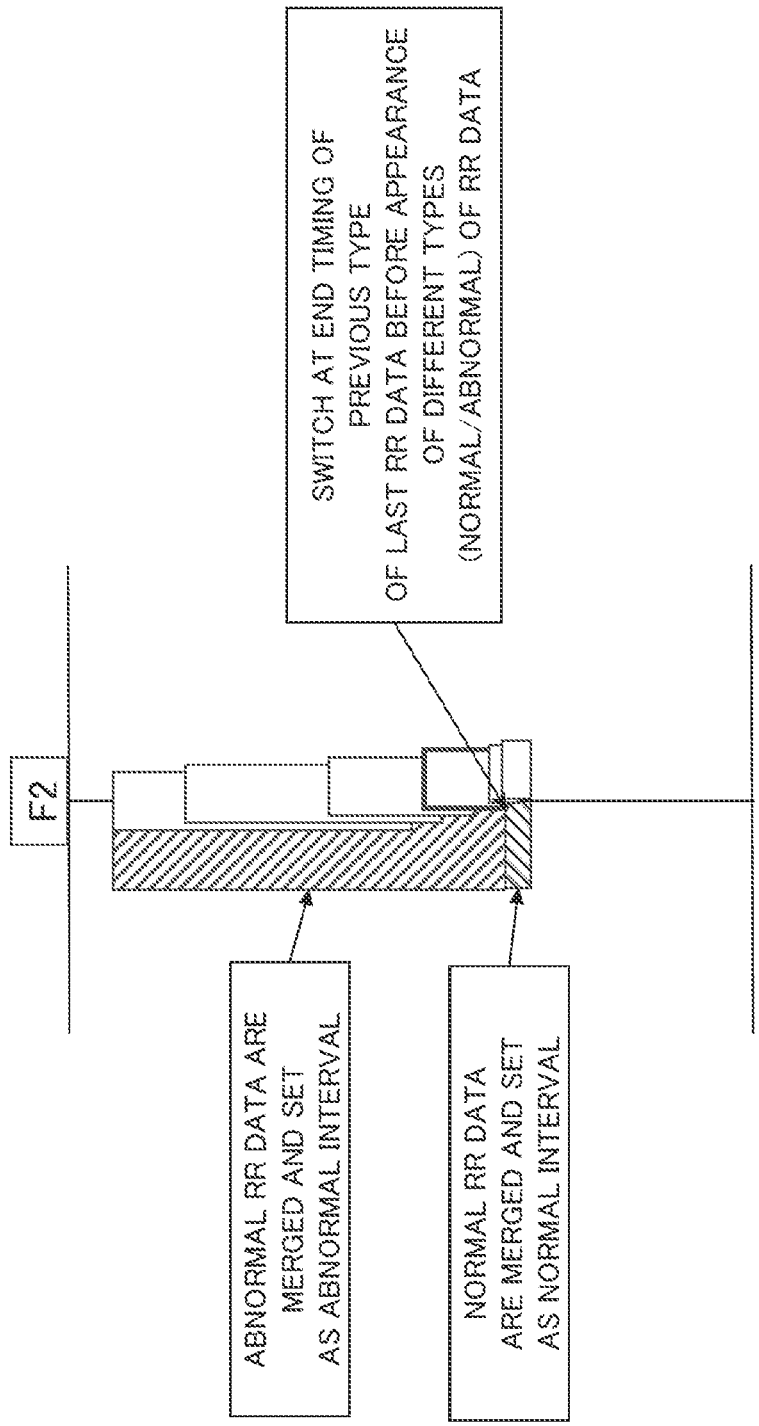
FIG. 28 is a diagram illustrating a state in which an interval is switched is separated at an end timing of the previous type of the last RR data before appearance of different types of RR data in an embodiment.

(Method 2) The interval is separated at an end timing of a previous type of the last RR data upon appearance of different types (normal/abnormal) of RR data (see FIG. 28).

Figure 29:
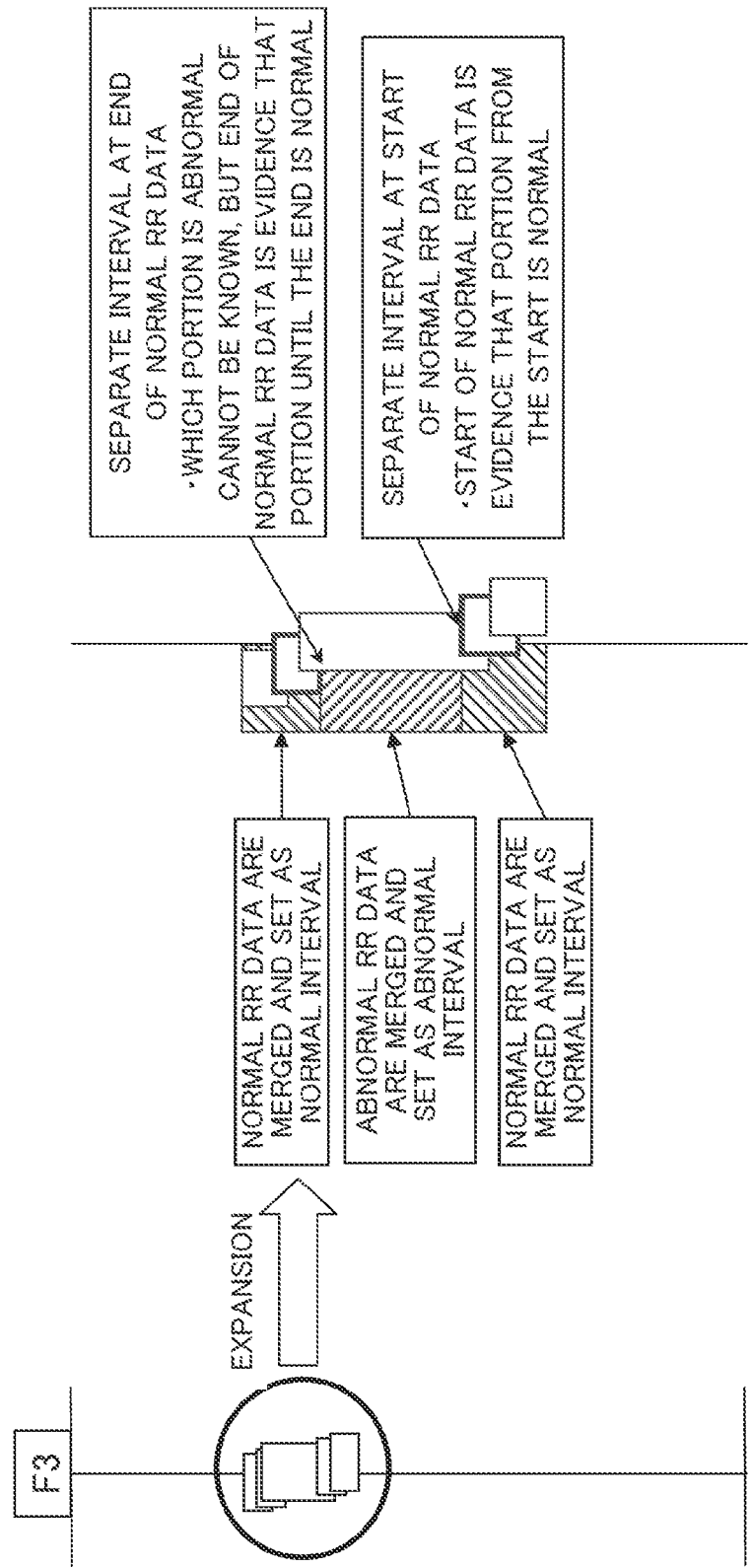
FIG. 29 is a diagram illustrating a state in which an interval is cut as a normal interval at the start of normal RR data, and an interval is cut at the end of normal RR data.

(Method 3) The interval is separated as the normal interval at the start of the normal RR data, and the interval is separated at the end of the normal RR data (see FIG. 29). Usually, the method 3 may be used. The reason for separating the interval at the end of the normal RR data is that which portion is abnormal cannot be known, but the end of the normal RR data is an evidence that a portion until the end is normal. The reason for separating the interval at the start of the normal RR data is that the start of the normal RR data is an evidence that a portion from the start is normal.

(Variation)

A timing covering components as many as possible may be found. This is because as more components appear, the narrowing degree is high. Also, a timing where functions (for example, URL type) are gathered as many as possible may be found. This is because as there are more patterns, the narrowing is easier.

For example, at a timing A illustrated in FIG. 30A, the RR data of some function (F2) does not appear. However, at a timing illustrated in FIG. 30B, the RR data of all functions (F1, F2, F3) appear. In this case, the RR data of the timing B instead of the timing A may be used for determination.

Further, it may wait until a plurality of RR data of the same function (for example, URL) appears. This is because just one may be a chance. For example, at the timing A illustrated in FIG. 31A, only one RR data of each function F1, F2 and F3 appears. However, at the timing B illustrated in FIG. 31B, a plurality of RR data of each function F1, F2 and F3 appears. In this case, the RR data of the timing B instead of the timing A may be used.

(Analysis Apparatus Notifying Point Having Conflict Probability)

Figure 32A:
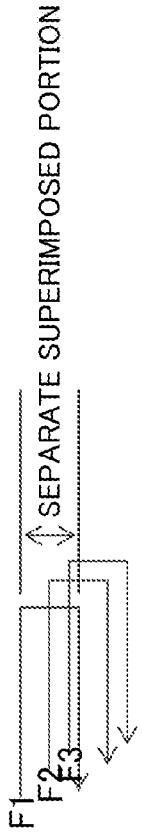
FIGS. 32A to 32C are diagrams schematically describing a concrete conflict and an implicit conflict according to an embodiment.

As schematically illustrated in FIG. 32A, the RR data temporally superimposed with the delay RR data is separated, and the problem point is narrowed in the separated range. This is based on the idea that the use of statistic values alone cannot detect the occurrence of instantaneous conflict.

(Detection of Concrete Conflict)

Figure 32C:
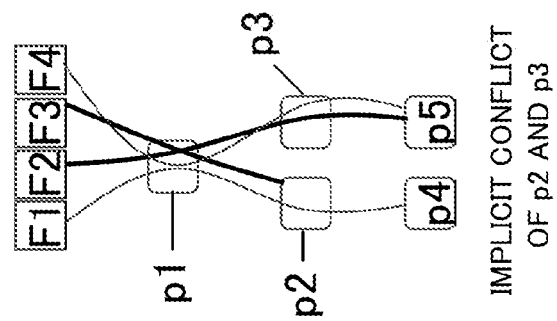
Figure 32B:
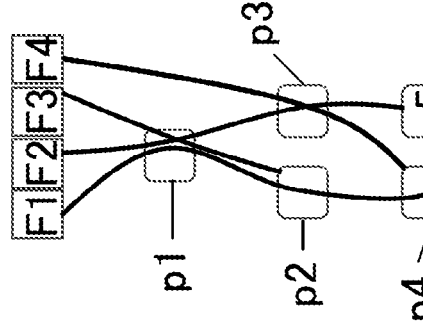

It is notified that the narrowing is actually possible as the problem point. FIG. 32B is an example in which p5 is a concrete conflict point.

(Detection of Implicit Conflict)

The point that does not appear as a common problem point but generates the same problem at a high probability if a problem occurs is notified as an implicit conflict (it should not conflict but it conflicts with something in the back). This corresponds to a combination of a short-term analysis and a long-term analysis in a certain sense. FIG. 32C illustrates an example in which p2 and p3 are the implicit conflict points.

(Notification of Conflict-Possible Point)

The point is notified as the conflict-possible point, including the concrete conflict and/or the implicit conflict. The accuracy may be ranked from the narrowing degree and the simultaneous generation probability.

(Accuracy is Improved by Supplement with Information Upon Analysis)

Figure 33:
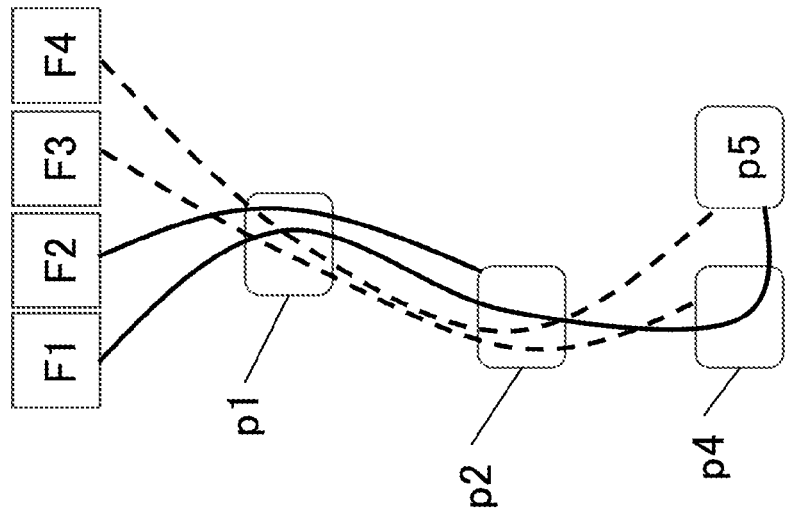
FIG. 33 is a diagram illustrating an example of a relationship between functions and components according to an embodiment.

When the narrowing is impossible in the information of the analysis phase, a point that "the identification is possible if no problem (or deterioration) is proved by this checkpoint" is extracted. For example, in FIG. 33, when wanting to identify which one of p4 and p5 is the cause, a request passing through the point is input from the data used in the pre-analysis phase. It is more efficient if preparing for a supplementary table (index) that extracts a "candidate request" from the point.

A flow of generating the supplementary table is illustrated in FIG. 34.

For example, the path analysis unit 420 (see FIG. 1) scans all points (p1, p2, p3, p4, p5) included in the path information (see, for example, FIG. 35A) in the path information database 404 (processing P311), and checks whether a point exists (processing P312).

As the checking result, when the point exists (Yes in processing P312), the path analysis unit 420 extracts all function IDs passing through the currently targeted point (key point) (x) (processing P313). For example, in FIGS. 33 and 35A, when the key point is p4, the functions F1 and F3 pass, and thus, the functions F1 and F3 are extracted. Also, when the key point is p1, the functions F1, F2, F2, F3 and F4 pass, and thus, the functions F1, F2, F2, F3 and F4 are extracted.

Next, the path analysis unit 420 extracts all points (Y) used by the extracted function ID group (processing P314). For example, when the extracted functions are F1 and F3, p1, p2, p3, p4 and p5 are extracted. Also, when the extracted functions are F1, F2, F2, F3 and F4, p1, p2, p4 and p5 are extracted.

When there is a point (exclusive point) (z) not passing through self-function (a) in a point combination (x)-(Y) for each function ID (a), the path analysis unit 420 outputs a combination with (x) to the table (processing P315), and returns to processing P311.

For example, in the function F1, all pass through (Y)=p1, p2, p4 and p5. In the function F3, p5 does not pass through (Y)=p1, p2, p4 and p5. In this case, the path analysis unit 420 outputs the record of p4, p5 and F3 to the table. The corresponding record means that the function F3 passes through p4 but does not pass through p5 (see FIG. 35B).

Also, the function F1 passes through all points. The function F2 does not pass through the points p4 and p5. Therefore, the path analysis unit 420 outputs the record of (p1, p4, F2) and (p1, p5, F2) to the table. Also, since the function F3 does not pass through the point p5, the path analysis unit 420 outputs the record of p1, p5, (F2), and F3 to the table. Also, since the function F4 does not pass through the point p4, the path analysis unit 420 outputs the record of p1, p4, (F2), and F4 to the table.

In this manner, with respect to the path information illustrated in FIG. 35A, the supplementary table (exclusive point table) illustrated in FIG. 35B is generated. Note that, in processing P312, when the point does not exist (No route in processing P312), the path analysis unit 420 ends the processing.

Figure 36:
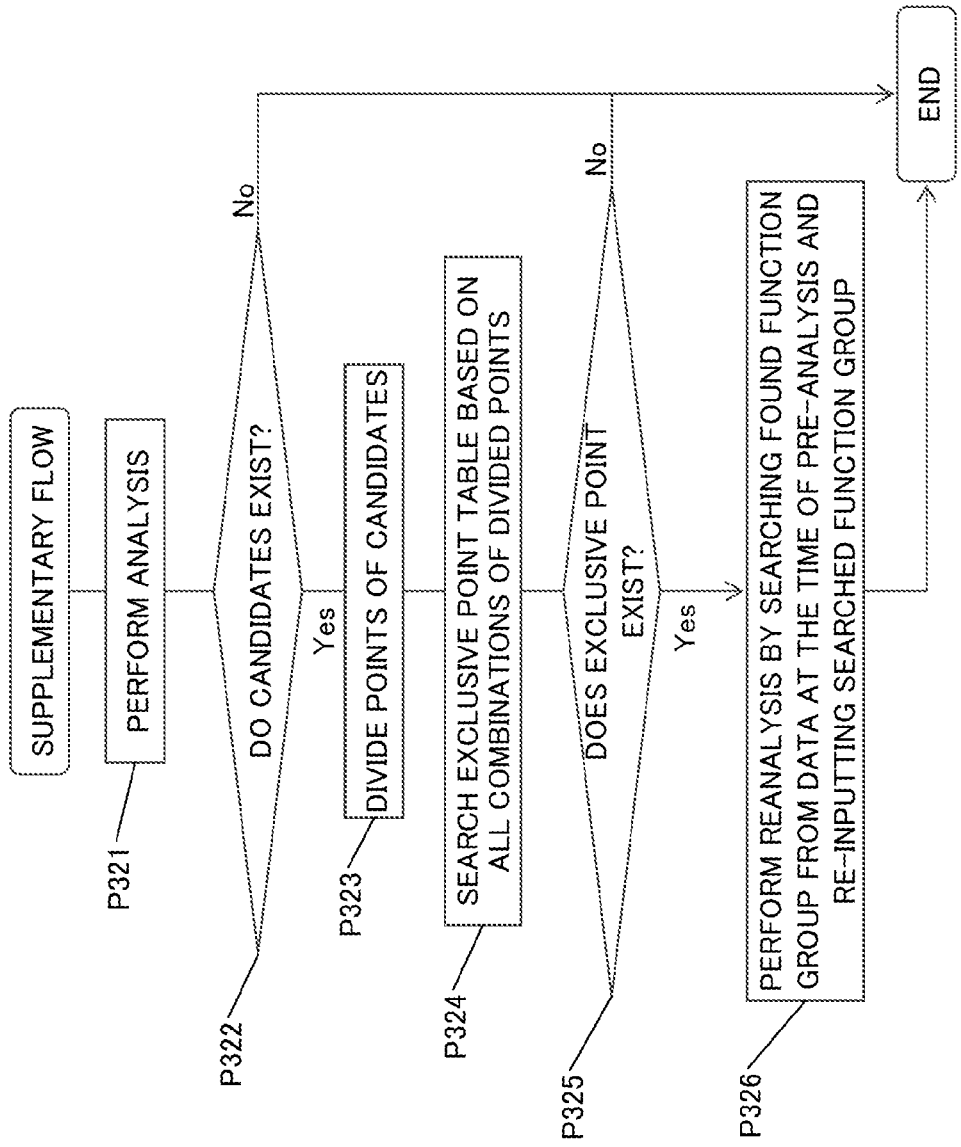
FIG. 36 is a supplementing flowchart according to an embodiment.

Note that, it is more efficient if preparing for a table (index) such that the "candidate request" can be extracted by narrowing. A flow of supplementing data when data is lacking is illustrated in FIG. 36.

The path analysis unit 420 performs analysis (processing P321), and checks whether a plurality of candidates exists (processing P322). For example, in the actual operation phase, p4 and p5 become delay candidates when data in which the function F1 is abnormal and the function F2 is normal exists and data regarding the functions F3 and F4 does not exist.

When the plurality of candidates exists (Yes in processing P322), the path analysis unit 420 divides points of the candidates (processing P323). For example, when the candidates are p4 and p5, the points of the candidates are divided into p4 and p5.

Next, the path analysis unit 420 searches the exclusive point table (see, for example, FIG. 35B) in all combinations of the divided points (processing P324). For example, the function F3 is found if searching the exclusive point table illustrated in FIG. 35B with a search key=p4 and an exclusive point key=p5. Also, the function F4 is found if searching the exclusive point table illustrated in FIG. 35B with a search key=p5 and an exclusive point key=p4.

The path analysis unit 420 checks whether the exclusive point exists (processing P325). When the exclusive point exists (Yes in processing P325), reanalysis is performed by searching a found function group from data of the pre-analysis phase and re-inputting the searched function group (processing P326). For example, data corresponding to the functions F3 and F4 found in processings P324 and P325 are re-input and analyzed.

By re-inputting the "candidate request", the information of a deficient targeted check point can be supplemented, and the problem point can be narrowed (identified). For example, if there is no problem by re-inputting the request corresponding to the function F3, it may be determined (identified) that the cause of deterioration is p5.

Note that, when the narrowing (identification) cannot be performed, other "candidate request" may be used. For example, if the deterioration is caused by re-inputting the request corresponding to the function F4, it may be determined that p4 is suspected as the cause of deterioration. The reliability may be increased by re-inputting a plurality of requests.

(Accuracy Improvement 1 Using Appearance Probability)

In order to improve the accuracy of the problem point identification, a method using an appearance probability (frequency) may be considered.

(Pre-Analysis Phase)

Figure 37:
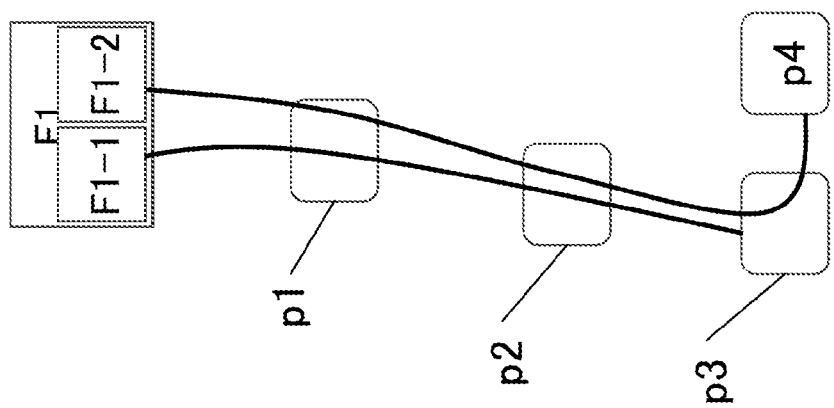
FIG. 37 is a diagram illustrating an example of a relationship between functions and components according to an embodiment.

For example, as illustrated in FIG. 37, when passing through two types of paths, F1=p1-p2-p3 and F1=p1-p2-p3-p4, it is impossible to identify which one of the two paths the function F1 passes through, from external information such as parameter of F1.

Herein, the path of p1-p2-p3 is set as F1-1, and the path of p1-p2-p3-p4 is set as F1-2. The parameter of F1 alone cannot classify which one of F1-1 and F1-2 the function F1 passes through, but can identify which path the function F1 passes through in the pre-analysis phase. Thus, the path analysis unit 420 counts each frequency. As a result, the appearance probability of F1, for example, may be prepared as follows: F1-1 is 70% and F1-2 is 30%.

(Actual Operation Phase)

The information of the actual operation phase alone can know that the function is F1 by the parameter, but cannot identify whether the path is the F1-1 path or the F1-2 path. In a case where F1 has good response at a probability of 70% and has bad response at a probability of 30%, it may be estimated by the problem point identifying unit 460 that the point of p4, which is a difference between F1-1 and F1-2, is the cause of deterioration.

(Flow Using Appearance Probability)

In processing P60 of the flow in the pre-analysis phase illustrated in FIG. 4, the path analysis unit 420, for example, registers the frequency information (table) in the appearance probability information database 405 as illustrated in FIG. 38.

Figure 39:
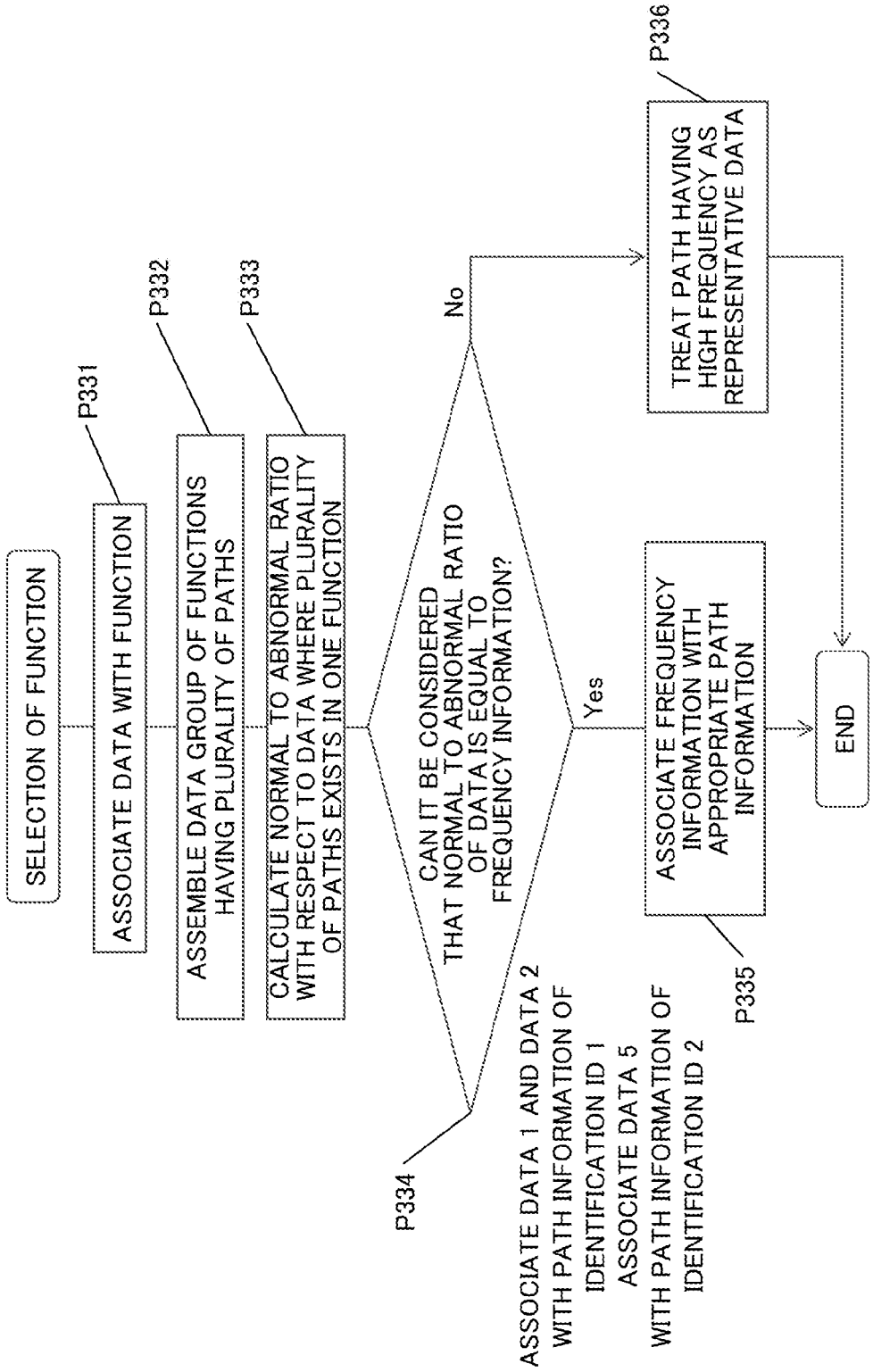
FIG. 39 is a flowchart describing an example of function selection processing according to an embodiment.

As illustrated in FIG. 39, the path analysis unit 420 associates the data with the function (processing P331). For example, the data and the function are associated as follows: "data 1: F1=○", "data 2: F1=○", "data 3: F2=○", "data 4: F3=×", and "data 5: F1=×".

Next, the path analysis unit 420 assembles a data group of functions having a plurality of paths (processing P332). For example, it can be known from the frequency information table illustrated in FIG. 38 that the function F1 has a plurality of path information. Thus, three data groups, "data 1: F1=O", "data 2: F1=O", and "data 5: F1=x", are assembled.

Further, the path analysis unit 420 calculates a normal to abnormal ratio with respect to data where a plurality of paths exists in one function (processing P333). In the case of the above-described example, 66.7% is normal and 33.3% is abnormal.

The path analysis unit 420 checks whether it can be considered that the normal to abnormal ratio of data is equal to the frequency information (processing P334). In the case of the above-described example, since 66.7% is normal and 33.3% is abnormal, it can be considered as equal to each other. When considered as equal to each other (Yes in processing P334), the path analysis unit 420 associates the frequency information with appropriate path information (processing P335). On the other hand, when not considered as equal to each other (No in processing P334), the path analysis unit 420 treats a high-frequency path as representative data (processing P336).

(Accuracy Improvement 2 Using Appearance Probability)

Figure 40:
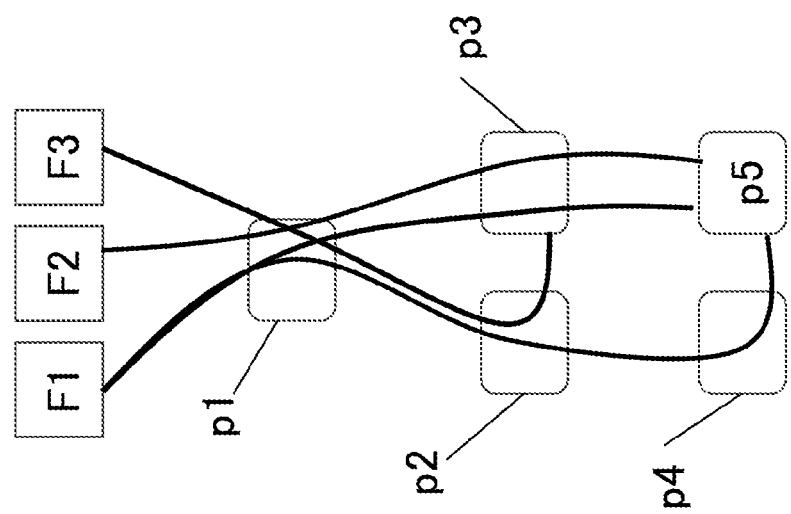
FIG. 40 is a diagram illustrating an example of a relationship between functions and components according to an embodiment.

As illustrated in FIG. 40, the path of the function F1 has two types, that is, F1 (F1-1)=p1-p2-p4-p5 and F1 (F1-2)=p1-p3-p5, the path of the function F2 is F2=p1-p3-p5, and the path of the function F3 is F3=p1-p2-p3. In this case, a plurality of paths that cannot be classified by the parameter or the like exists in the function F1.

The pre-data collection unit 410 reproduces the request data stored in the user request database 403, and the path analysis unit 420 counts a frequency of the request data passing through each function as illustrated in FIG. 41 (counts a frequency at each Fi and pi).

In the actual operation phase, the function selection unit 440 counts the appearance frequency of each check point (pi) (see FIG. 42). However, details information regarding the function Fi is not checked because the log collection amount or the throughput by the association processing increases.

In FIG. 20, it is assumed that F1 and F2 are deteriorated and F3 is normal. In this case, the possibility of cause of deterioration remains in p4 and p5. Among all requests during the aggregation interval of the function F1 of the actual operation phase, for example, the request of 28% (=14/50) is assumed as deteriorated. In this case, as compared with the frequency information table illustrated in FIG. 41, the path of F1-2 (p1-p3-p5) is estimated as deteriorated. Hence, it can be seen that p4 (F1-1) is not deteriorated. As a result, p5 can be determined as the cause point.

According to one aspect, analyzable data can be found with suppressing a computation amount, which in turn improves analysis accuracy.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium storing therein an analysis program that causes a computer to execute a process, the computer being provided as part of a system comprising the computer and a plurality of modules connected via a network, the system executing a plurality of functions of an analysis target by the plurality of modules, each of the plurality of functions utilizing a path of one or more of the plurality of modules and at least two of the plurality of functions utilizing a common module of the plurality of modules, the process comprising:

collecting log data for each of the plurality of functions;

analyzing the log data to determine, for each function of the plurality of functions, whether a delay is present in the path of the function, based on a response time derived from the log data;

classifying, for each function of the plurality of functions, one or more of a normal interval and an abnormal interval of the function based on the analyzed log data, the normal interval being a time interval for data in which no delay is determined and the abnormal interval being a time interval for data in which a delay is determined;

defining, as an aggregation interval, a time interval at which two or more functions have an abnormal interval and one or more functions have a normal interval;

identifying the one or more modules of paths of each function during the aggregation interval; and detecting, as an abnormal module, a module of the plurality of modules that is present in two or more paths of functions with abnormal intervals during the aggregation interval and is not present in any path of the functions with normal intervals during the aggregation interval, the abnormal module causing abnormalities of the one or more functions of the analysis target.

2. An analysis apparatus comprising:

a memory; and a processor being coupled to the memory, the analysis apparatus being provided as part of a system comprising the analysis apparatus and a plurality of modules connected via a network, the system executing a plurality of functions of an analysis target by the plurality of modules, each of the plurality of functions utilizing a path of one or more of the plurality of modules and at least two of the plurality of functions utilizing a common module of the plurality of modules, and the processor being configured to:

collect log data for each of the plurality of functions;

analyze the log data to determine, for each function of the plurality of functions, whether a delay is present in the path of the function, based on a response time derived from the log data;

classify, for each function of the plurality of functions, one or more of a normal interval and an abnormal interval of the function based on the analyzed log data, the normal interval being a time interval for data in which no delay is determined and the abnormal interval being a time interval for data in which a delay is determined;

define, as an aggregation interval, a time interval at which two or more functions have an abnormal interval and one or more functions have a normal interval;

identify the one or more modules of paths of each function during the aggregation interval; and detect, as an abnormal module, a module of the plurality of modules that is present in two or more paths of functions with abnormal intervals during the aggregation interval and is not present in any path of the functions with normal intervals during the aggregation interval, the abnormal module causing abnormalities of the one or more functions of the analysis target.

3. An analysis method for a computer provided as part of a system comprising the computer and a plurality of modules connected via a network, the system executing a plurality of functions of an analysis target by the plurality of modules, each of the plurality of functions utilizing a path of one or more of the plurality of modules and at least two of the plurality of functions utilizing a common module of the plurality of modules, the method comprising:

collecting log data for each of the plurality of functions;

analyzing the log data to determine, for each function of the plurality of functions, whether a delay is present in the path of the function, based on a response time derived from the log data;

classifying, for each function of the plurality of functions, one or more of a normal interval and an abnormal interval of the function based on the analyzed log data, the normal interval being a time interval for data in which no delay is determined and the abnormal interval being a time interval for data in which a delay is determined;

defining, as an aggregation interval, a time interval at which two or more functions have an abnormal interval and one or more functions have a normal interval;

identifying the one or more modules of paths of each function during the aggregation interval; and detecting, as an abnormal module, a module of the plurality of modules that is present in two or more paths of functions with abnormal intervals during the aggregation interval and is not present in any path of the functions with normal intervals during the aggregation interval, the abnormal module causing abnormalities of the one or more functions of the analysis target.

* * * * *